US012664710B1

(12) United States Patent
Hu et al.

(10) Patent No.: US 12,664,710 B1
(45) Date of Patent: Jun. 23, 2026

(54) ARTIFICIAL INTELLIGENCE (AI)-BASED CUSTOMIZED STORYTELLING VIDEO GENERATION SYSTEM

(71) Applicant: MOHAMED BIN ZAYED UNIVERSITY OF ARTIFICIAL INTELLIGENCE, Abu Dhabi (AE)

(72) Inventors: Panwen Hu, Abu Dhabi (AE); Xiaodan Liang, Abu Dhabi (AE)

(73) Assignee: MOHAMED BIN ZAYED UNIVERSITY OF ARTIFICIAL INTELLIGENCE, Abu Dhabi (AE)

( * ) Notice: Subject to any disclaimer, the term of this patent is extended or adjusted under 35 U.S.C. 154(b) by 0 days.

(21) Appl. No.: 19/460,704

(22) Filed: Jan. 27, 2026

Related U.S. Application Data

(63) Continuation of application No. 19/051,056, filed on Feb. 11, 2025.

(51) Int. Cl.
    *G06T 13/00*    (2011.01)
    *G06N 3/0455*    (2023.01)
    *G06T 11/60*    (2006.01)

(52) U.S. Cl.
    CPC ........... *G06T 13/00* (2013.01); *G06N 3/0455* (2023.01); *G06T 11/60* (2013.01)

(58) Field of Classification Search
None
See application file for complete search history.

(56) References Cited

U.S. PATENT DOCUMENTS 12,322,036 B1 * 6/2025 Affleck-Boldt ...... H04N 5/2224
2024/0331445 A1 * 10/2024 Sekar ................. G06V 10/7715
(Continued)

FOREIGN PATENT DOCUMENTS

CN    118714397 A    9/2024
CN    118828135 A    10/2024
JP    7578209 B1    11/2024

OTHER PUBLICATIONS

Wenhao WANG, et al., "VidProm: A Million-scale Real Prompt-Gallery Dataset for Text-to-Video Diffusion Models", 38th Conference on Neural Information Processing Systems (NeurIPS 2024) Track on Datasets and Benchmarks. arXiv:2403.06098v4 [cs.CV], Sep. 30, 2024, 24 pages.

*Primary Examiner* — Stephen S Hong
*Assistant Examiner* — Toan H Vu
(74) *Attorney, Agent, or Firm* — Oblon, McClelland, Maier & Neustadt, L.L.P.

(57) ABSTRACT

A system for performing artificial intelligence (AI)-based customized storytelling video generation includes a story designer AI agent, a storyboard generator AI agent, a video creator AI agent, an agent manager AI agent, and an observer AI agent. Coordinated by the agent manager AI agent, the agents collaboratively process a textual prompt and a reference video provided by a user to generate a multi-shot video depicting a story of a customized subject from the reference video. The story designer, agent manager, and observer AI agents leverage Large Language Models (LLMs), while the storyboard generator AI agent employs a three-step pipeline of generation, removal, and redrawing to maintain character detail consistency across video shots. The video creator AI agent utilizes a Latent Diffusion Model (LDM) based Image-to-Video (I2V) model to ensure intra-shot character detail consistency. The system achieves high-quality, coherent storytelling videos with customizable subject fidelity.

20 Claims, 16 Drawing Sheets

1200 ⬎

Shot 1: Miffy makes up one bright morning, ready to embark on a day filled with adventure.
Shot 2: First stop is the bustling town square, where Miffy greets friends.
Shot 3: Miffy explores the enchanting forest, admiring nature's beauty.
Shot 4: As the sun sets, Miffy relaxes on the beach, watching the golden hues of twilight.

Reference videos    TI-AnimateDiff    DreamVideo    Magic-Me    System
100

(56)                     References Cited

U.S. PATENT DOCUMENTS

| 2025/0139468 A1* | 5/2025 | Taylor | H04N 21/85 |
|---|---|---|---|
| 2025/0166664 A1* | 5/2025 | Karim | G06F 40/40 |
| 2025/0200843 A1* | 6/2025 | Wilson | G06T 7/60 |
| 2025/0210064 A1* | 6/2025 | McGuire | G11B 27/034 |
| 2025/0356883 A1* | 11/2025 | Wittmann | G11B 27/036 |
| 2025/0371324 A1* | 12/2025 | Boyd | G06N 3/0475 |
| 2025/0378620 A1* | 12/2025 | Korolev | G06T 15/04 |
| 2026/0030304 A1* | 1/2026 | Yap | G06F 16/9535 |
| 2026/0064977 A1* | 3/2026 | Kumar | G06F 40/40 |
| 2026/0080223 A1* | 3/2026 | Lifshits | G06N 3/0475 |

* cited by examiner

ARTIFICIAL INTELLIGENCE (AI)-BASED CUSTOMIZED STORYTELLING VIDEO GENERATION SYSTEM

STATEMENT REGARDING PRIOR DISCLOSURE BY THE INVENTORS

Aspects of this technology are described in an article by Panwen Hu, Jin Jiang, Jianqi Chen, Mingfei Han, Shengcai Liao, Xiaojun Chang, and Xiaodan Liang, "StoryAgent: Customized Storytelling Video Generation via Multi-Agent Collaboration," submitted to arXiv on Nov. 7, 2024, an article by Panwen Hu, Jin Jiang, Jiangi Chen, Mingfei Han, Shengcai Liao, Xiaojun Chang, and Xiaodan Liang, "StoryAgent: Customized Storytelling Video Generation via Multi-Agent Collaboration", submitted to the thirty-eighth Annual Conference on Neural Information Processing Systems (NeurIPS 2024) Dec. 10-15, 2024, and an article by Panwen Hu, Jin Jiang, Jianqi Chen, Mingfei Han, Shengcai Liao, Xiaojun Chang, and Xiaodan Liang, "StoryAgent: Customized Storytelling Video Generation via Multi-Agent Collaboration," submitted to the thirteenth International Conference on Learning Representations (ICLR 2025) Apr. 24-28, 2025. All these publications are herein incorporated by reference in their entirety.

BACKGROUND

Technical Field

The present disclosure is directed to a multi-agent framework for customized storytelling video generation using artificial intelligence techniques.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Storytelling, an integral aspect of human communication, has witnessed remarkable transformations in its medium and form with the advent of digital technologies. Over the years, advancements in artificial intelligence (AI) and machine learning (ML) have paved the way for significant innovations in automated content creation, including text-to-video (T2V) and image-to-video (I2V) generation techniques. Despite these developments, existing systems face critical limitations in producing high-quality, contextually coherent, and visually consistent storytelling videos, especially in open-domain contexts.

State-of-the-art methods, such as a Sparse Control (SparseCtrl) and a Sparse Video Diffusion (SVD), have attempted to address specific aspects of video generation, such as narrative alignment and animation of storyboards. The SparseCtrl is a method for video generation that focuses on controlling sparse, high-level features to guide the synthesis process and the SVD is a video generation technique that leverages sparse diffusion processes for improved temporal consistency and video quality. However, these methods are often constrained by their inability to preserve subject consistency and temporal coherence across video frames, leading to fragmented narratives and visually inconsistent outputs. For instance, the SparseCtrl employs a sparse attention mechanism to guide content generation but struggles with maintaining fidelity in dynamic storylines. Similarly, while the SVD focuses on generating videos from textual descriptions, the SVD exhibits limitations in achieving inter-shot consistency and adapting to diverse narrative requirements.

The demand for storytelling video generation spans various domains, including education, entertainment, marketing, and training. Modern applications require customizable and scalable solutions that dynamically adapt to varying inputs such as text descriptions, images, or scripts. However, current solutions are often plagued by the absence of mechanisms for preserving character identity and narrative flow, particularly in scenarios involving complex or evolving storylines.

Research efforts have increasingly focused on addressing these challenges using advanced AI techniques. For instance, latent diffusion models for image animation have shown promise in generating high-quality visual content. Still, these models fail to integrate narrative elements into the video seamlessly. (See: Ramesh, Aditya, et al., "Hierarchical Text-Conditional Image Generation with CLIP Latents," arXiv preprint arXiv:2204.06125, incorporated herein by reference in its entirety). Similarly, frameworks like DREAMFUSION have demonstrated the potential for synthesizing realistic three-dimensional (3D) visuals but fall short of contextualizing these 3-D visuals within a coherent narrative. (See: Poole, Ben, et al., "DreamFusion: Text-to-3D using 2D Diffusion," arXiv preprint arXiv:2209.14988, incorporated herein by reference in its entirety).

U.S. Patent Publication US20210269123A1 discloses a video generation system that leverages Generative Adversarial Network (GAN)-based models to create visual sequences from input data. However, the disclosed video generation system lacks a multi-agent framework for addressing storytelling-specific challenges such as consistency and adaptability. Similarly, U.S. Patent Publication US20210365987A1 describes a text-to-video generation method but does not provide mechanisms for dynamically managing diverse storylines or subject identities.

There is, therefore, a need for a system that integrates advanced AI techniques with a multi-agent framework to deliver high-quality, customized storytelling videos. Such a system should effectively address challenges related to subject consistency, temporal coherence, and alignment with narrative intent while enabling fine-grained customization for diverse use cases.

SUMMARY

In an embodiment, a system for performing artificial intelligence (AI)-based customized storytelling video generation is described. The system includes a story designer AI agent, a storyboard generator AI agent, a video creator AI agent, an agent manager AI agent and an observer AI agent. Based on a textual prompt and a reference video provided by a user of the system, under the coordination of the agent manager AI agent, the story designer AI agent, the storyboard generator AI agent, the video creator AI agent, and the observer AI agent cooperate to generate a multi-shot video, the multi-shot video depicting a story of a customized subject presented in the reference video. Each of the story designer AI agent, the agent manager AI agent, and the observer AI agent is based on a Large Language Model (LLM). The storyboard generator AI agent uses a three-step storyboard generation pipeline to preserve consistency of character details of the customized subject across shots of the multi-shot video. The pipeline includes a generation step, a removal step, and a redrawing step. The video creator AI agent is based on a Latent Diffusion Model (LDM)-based Image-to-Video (I2V) generation model configured to preserve the consistency of the character details of the customized subject within each shot of the multi-shot video.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
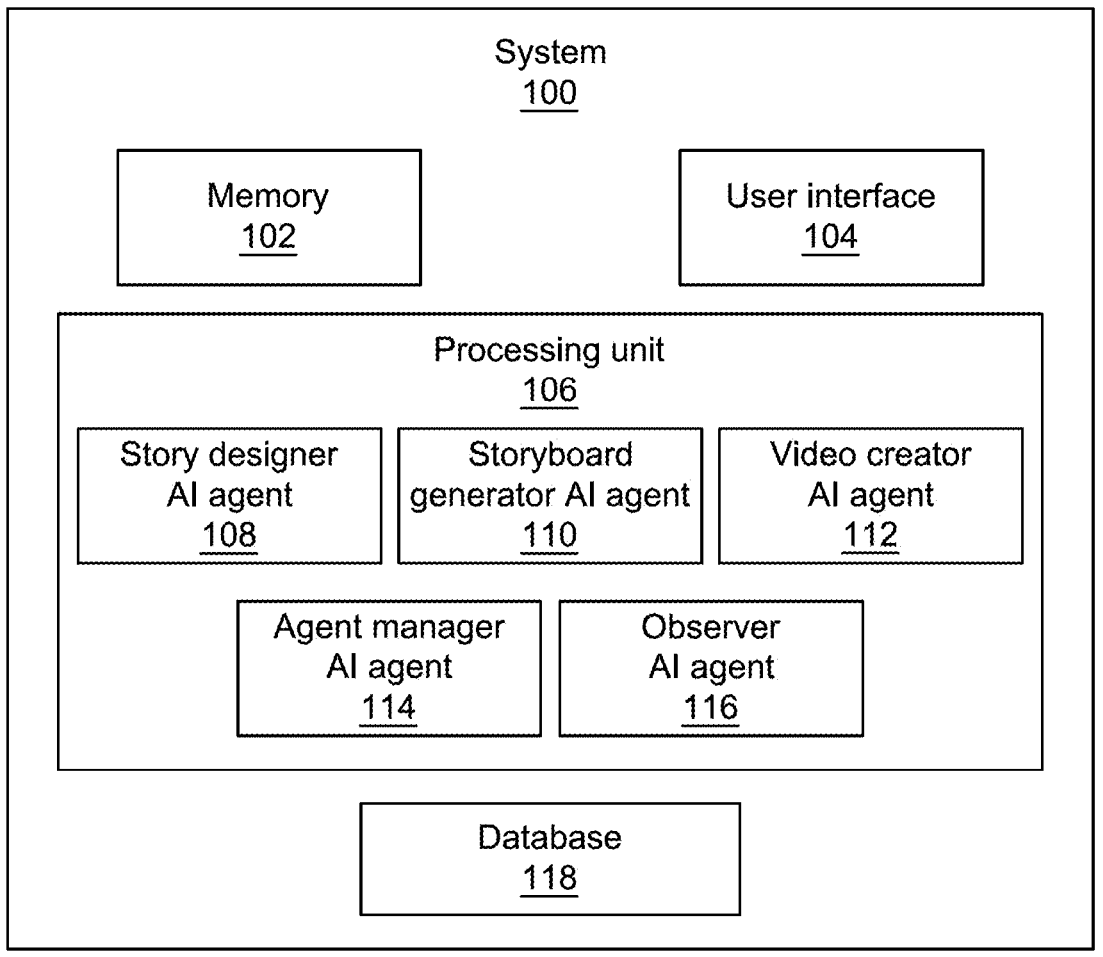
FIG. 1 illustrates an exemplary representation of a system for performing artificial intelligence (AI)-based customized storytelling video generation, according to certain embodiments.

In the drawings, like reference numerals designate identical or corresponding parts throughout the several views.

Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

The present invention provides a transformative approach to storytelling video generation. "Storytelling video generation" refers to a process of creating videos that tell a story, often using various tools, methods, and technologies to produce and craft the narrative. This process typically involves several stages, such as planning, scripting, shooting, editing, and adding elements like music, voiceover, and special effects to bring the story to life. Storytelling videos are designed to engage viewers emotionally, providing them with a relatable experience or a glimpse into a new world. The present invention introduces a system, a multi-agent framework for customized storytelling video generation (CSVG). The present invention provides a structured yet adaptable system of agents, each performing distinct roles to ensure efficient and high-quality video generation. By decomposing the intricate task of CSVG into well-defined subtasks, the present invention enables users to create multi-shot storytelling videos with exceptional consistency and visual quality. The present invention involves five agents, each contributing separately and/or uniquely to the process. A story designer drafts detailed storylines and scene descriptions based on user-provided inputs. A storyboard generator then translates these narratives into precise storyboards aligned with the described narrative and the reference subject. A video creator then synthesizes videos from the generated storyboards, ensuring high intra-shot consistency. To maintain order and efficiency, an agent manager coordinates the activities of all agents while the observer reviews the outputs, offering feedback to refine the generated results.

Further, the present invention includes LoRA-BE (Low-Rank Adaptation with Block-wise Embeddings) and an Image-to-Video (I2V) method to enhance temporal consistency within individual shots, substantially improving the coherence and overall visual quality of the storytelling videos. Furthermore, by leveraging diverse generative models, the framework provides users with greater control and flexibility throughout the video generation process. The adaptability allows the present invention to perform a wide range of tasks beyond CSVG, making it a versatile and innovative solution for storytelling video production. The present invention provides inter-shot and intra-shot consistency and flexibility in adapting to varying storytelling inputs, thereby meeting the growing demands of modern applications across multiple domains.

In various aspects of the disclosure, non-limiting definitions of one or more terms used to describe aspects of the present disclosure are provided below.

A term "Artificial Intelligence (AI)" refers to the simulation of human intelligence processes by machines, particularly computer systems, for tasks such as learning, reasoning, and problem-solving.

A term "Large Language Model (LLM)" refers to an AI model designed for processing and generating human-like text using extensive pre-trained datasets.

A term "Latent Diffusion Model (LDM)" refers to a generative AI framework used for image-to-video transformation, ensuring high-quality and consistent video outputs.

A term "Image-to-Video (I2V)" refers to a process of generating video sequences from a given image or set of images, maintaining subject and temporal consistency.

A term "Reference Video" refers to a video provided by the user as a template to define the subject or theme for generating a storytelling video.

A term "Fréchet Video Distance (FVD)" refers to a metric that quantifies the quality and coherence of generated videos by comparing their statistical distributions with those of real videos, where lower FVD scores indicate better alignment and video quality.

A term "Peak Signal-to-Noise Ratio (PSNR)" refers to a measure of the quality of reconstructed videos by comparing the pixel-wise differences between a generated video and a reference video (ground truth video). A higher PSNR value indicates better visual fidelity.

A term "Structural Similarity Index Measure (SSIM)" refers to a metric that evaluates the perceptual similarity between the generated and the ground truth videos by considering structural, luminance, and contrast similarities. A higher SSIM score reflects closer alignment to an original video.

A term "Learned Perceptual Image Patch Similarity (LPIPS)" refers to a metric that measures the difference between deep features extracted from neural networks for the generated and reference videos. A lower LPIPS value indicates higher perceptual similarity.

FIG. 1 illustrates an exemplary representation of a system 100 for performing artificial intelligence (AI)-based customized storytelling video generation (hereinafter interchangeably referred to as "the system 100"), according to one or more aspects of the present disclosure. As shown in FIG. 1, the system 100 may include an interface(s)/user interface (UI) 104 and an artificial intelligence (AI)-based framework. The UI 104 facilitates an intuitive platform for a user to interact with the system 100. Through the UI 104, the user may enter textual prompts, upload reference videos, review outputs, and provide feedback, making the process seamless and user-friendly. The UI 104 is configured to receive a plurality of requests from the users. The plurality of requests may include data inputs, service requests, or commands. The UI 104 acts as the primary medium for communication between the user and the AI-driven framework. The textual prompt provided by the user includes a background description of the multi-shot video, outlining the context and setting. The textual prompt includes a detailed description of the action to be performed by a customized subject within this context. The customized subject refers to a specific character, object, or theme tailored to align with the input of the user, such as a reference video or textual prompt. Finally, the textual prompt specifies the desired number of shots to be included in the generated multi-shot video, indicating the desired level of granularity and the overall duration or pacing of the video.

The UI 104 may include a variety of interfaces, for example, interfaces for data input and output devices, referred to as I/O devices, storage devices, and the like. The UI 104 may facilitate communication to/from the system 100. The UI 104 may also provide a communication pathway for one or more components of the system 100. Examples of such components include, but are not limited to, a processing unit 106 and a database 118.

In an embodiment, the processing unit 106 may be implemented as a combination of hardware and programming (for example, programmable instructions) to implement one or more functionalities of the processing unit 106. In the examples described herein, such combinations of hardware and programming may be implemented in several different ways. For example, the programming for the processing unit 106 may be processor-executable instructions stored on a non-transitory machine-readable storage medium, and the hardware for the processing unit 106 may include a processing resource (for example, one or more processors), to execute such instructions. In the present examples, the machine-readable storage medium may store instructions that, when executed by the processing resource, implement the processing unit 106. In such examples, the system 100 may include the machine-readable storage medium storing the instructions and the processing resource to execute the instructions, or the machine-readable storage medium may be separate but accessible to the system 100 and the processing resource. In other examples, the processing unit 106 may be implemented by electronic circuitry. Among other capabilities, the processing unit 106 may be configured to fetch and execute computer-readable instructions stored in a memory 102 of the system 100. The memory 102 may be configured to store one or more computer-readable instructions or routines in a non-transitory computer-readable storage medium, which may be fetched and executed to create or share data packets over a network service. The memory 102 may include any non-transitory storage device including, for example, volatile memory such as Random Access Memory (RAM), or non-volatile memory such as Erasable Programmable Read-Only Memory (EPROM), flash memory, and the like.

In an embodiment, the database 118 may include data that may be either stored or generated as a result of functionalities implemented by any of the components of the processing unit 106. In an embodiment, the database 118 may be separate from the system 100. In an embodiment, the database 118 may be indicative of including, but not limited to, a relational database, a distributed database, a cloud-based database, or the like.

As shown in FIG. 1, the processing unit 106 may include the AI-based framework for customized storytelling video generation. The AI-based framework includes a story designer AI agent 108, a storyboard generator AI agent 110, a video creator AI agent 112, an agent manager AI agent 114, and an observer AI agent 116. Each of these components is configured to operate under the coordination of the agent manager AI agent 114 to collaboratively generate a multi-shot video based on the textual prompt and a reference video provided by the user. The multi-shot video includes multiple sequentially arranged shots. Each sequentially arranged shot captures a distinct segment of the narrative or scene. These shots are carefully designed to maintain continuity and consistency across transitions, contributing to the cohesive storytelling of the video.

Each of the story designer AI agent 108, the agent manager AI agent 114, and the observer AI agent 116 is configured to leverage large language model (LLM) capabilities to perform its respective tasks. The LLM is an AI model trained on extensive text data to understand, generate, and process human language. The storyboard generator AI agent 110 and the video creator AI agent 112 incorporate a three-step storyboard generation pipeline and latent diffusion model (LDM)-based mechanisms to ensure consistency of character details and maintain video quality throughout the storytelling process. The LDM is a generative AI model that transforms latent space representations into high-quality images or videos through iterative refinement processes.

In an operative step, when the user inputs the textual prompt via the user interface 104, the story designer AI agent 108 may be configured to perform a first step, tokenization. Tokenization is the process of breaking down the input into smaller units called tokens. Depending on the tokenizer used, these tokens can be words, subwords, or characters. The LLM then processes these tokens to understand the meaning and relationships between them. The LLM employs an attention mechanism that allows the model to consider the relationships between all the tokens in the input. Once the LLM processes the input, it uses what it has learned during training to predict what comes next in the sequence. When the user asks the LLM to generate a shot, it predicts one token at a time, using the previous tokens to inform the next. For instance, if the input concerns a specific topic (like climate change), the model will predict and generate shots consistent with the input's themes, tone, and style. As the model generates each input segment, it considers what has been generated so far, ensuring the shots flow logically from one shot to the next. This is essential for creating shots that are meaningful and easy to follow.

In an embodiment, the story designer AI agent 108 is configured to analyze the textual prompt provided by the user and generate a story script. The analysis involves parsing and interpreting the textual prompt to extract its semantic meaning and structure. To generate the story script, the story designer AI agent 108 employs computational techniques such as LLMs, Reinforcement Learning (RL), or Graph Neural Networks (GNNs). Using the LLM, the story designer AI agent 108 systematically performs essential functions for the generation and refinement of the story script. The story designer AI agent 108 processes the textual prompt (input) to identify key elements, including characters, actions, settings, and emotional tones. By leveraging the pre-trained knowledge, the LLM understands the context, intent, and nuances of the input. Based on this analysis, the story designer AI agent 108 translates the input into the story script, comprising story descriptions.

In an aspect, the story designer AI agent 108 is configured to apply the LLM to generate the story script based on the textual prompt. The generated story script includes a plurality of story descriptions. Each story description corresponds to one shot of the multi-shot video. Each shot typically focuses on a particular event, action, or character interaction, contributing to the overall progression of the story. The plurality of shots is organized sequentially to maintain the logical flow of the narrative and can vary in duration and composition depending on the emphasis required for that part of the story. By dividing the storyline into the plurality of shots, the video generation process ensures that each segment is visually and thematically cohesive while contributing to the broader narrative structure. The segmentation ensures that each shot is visually and thematically distinct while contributing meaningfully to the overarching narrative.

In an aspect, the story designer AI agent 108 is further configured to generate the story script by performing a series of systematic steps. The systematic steps include identifying a story requirement from the textual prompt provided by the user and generating a narrative storyline based on the identified story requirement. The systematic steps further include decomposing the generated narrative storyline into multiple shots. Each shot represents a distinct segment of the story. The segmentation ensures that each shot is visually and thematically distinct while contributing meaningfully to the overarching narrative. This decomposition provides a granular framework for detailed visualization and storytelling. For each of these shots, the story designer AI agent 108 generates a corresponding story description, ensuring that the plurality of story descriptions comprehensively represents the narrative. The story descriptions include detailed elements such as the characters appearing in the shot, their actions and interactions, the background scenes, the designated shot types (e.g., close-ups, wide shots, or panning sequences), and the motions describing camera movements or transitions. This level of detail ensures that each shot is comprehensively defined for subsequent visualization. This division ensures that each scene of the video is well-defined and contributes to the narrative flow, aligning with the vision of the user and maintaining consistency throughout the storytelling process. Each story description specifies details for its corresponding shot, including the character shown in the shot, an action of the character, a character region in the shot, a background scene, a shot type, and a shot motion, etc.

Additionally, the story designer AI agent 108 updates the narrative storyline and the associated story descriptions based on a review result provided by the observer AI agent 116, thereby refining the storyline and enhancing its coherence and alignment with the intent of the user.

In an operative aspect, the story designer AI agent 108 is further configured to generate the story script by identifying a story requirement from the textual prompt. Once the story requirement is identified from the textual prompt, the story designer AI agent 108 is further configured to generate the narrative storyline that aligns with the story requirements. The narrative storyline comprises a coherent sequence of events, character arcs, and themes tailored to fulfill the objectives of the textual prompt provided by the user. The coherent sequence of events refers to the chronological or logical progression of actions and occurrences within the story. The coherent sequence of events ensures the narrative flows smoothly, with each coherent sequence of event built upon the previous one. For instance, in a hero's or a character's journey, the story might begin with the hero leaving their home, followed by encountering challenges and culminating in the hero achieving their goal. The story designer AI agent 108 leverages the textual prompt to identify these key milestones and arranges them into a structured and logically connected storyline, ensuring the resulting video is engaging and easy to follow. The character arcs represent the development or transformation of characters as the story unfolds. The characters often start with specific traits or circumstances and evolve as they face challenges, learn lessons, or achieve their goals. For example, a timid character might grow into a confident leader by the end of the story. The character arc adds depth and relatability to the narrative. The story designer AI agent 108 ensures that the reference subject in the video embodies these arcs, designing actions, emotions, and behaviors that reflect the objectives of the textual prompt and create a compelling story. The themes convey the overarching ideas or messages of the story, providing emotional resonance and meaning beyond the surface events. The themes such as love, perseverance, or adventure unify the narrative and give it a deeper purpose. For example, a prompt like "A tale of friendship in challenging times" might lead to a theme of unity and resilience, with the narrative and visual elements emphasizing these ideas. By carefully crafting the themes, the system 100 ensures that the video communicates a consistent and impactful message.

In one aspect, the story designer AI agent 108 serves as the narrative foundation for the video generation process, transforming the textual prompt into structured and coherent story descriptions that guide subsequent stages of video production. The input of the user for the story designer AI agent 108 can include various elements that guide the creation of detailed storylines and scene descriptions. Textual prompts, such as a brief or detailed description of the story idea, themes, or key events, allow the user to outline the overall narrative vision. Reference videos may be provided for visual inspiration, helping to specify the style, tone, or subject matter desired for the storytelling video. Character descriptions, including details about their appearance, personality traits, or roles, can be incorporated to bring unique personalities into the narrative. Scene preferences, such as specific settings, locations, or moods, help shape the ambiance of the story. A general plot structure or story arc provided by the user ensures that the story unfolds cohesively, including a beginning, middle, and end. Additionally, the users may input specific dialogue or narration that must be included in scenes and customization options for style, pacing, or visual elements to make the story uniquely tailored to their requirements. These inputs are used/utilized by the story designer AI agent 108 to craft compelling and coherent storylines for further video generation.

Further, in an embodiment, the story designer AI agent 108 is configured to iteratively update the narrative storyline and the plurality of story descriptions based on the review result provided by the observer AI agent 116. The story designer AI agent 108 is further configured to update the narrative storyline and the plurality of story descriptions through an iterative process. The iterative process involves, via the agent manager AI agent 114, sending the narrative storyline and the plurality of story descriptions generated during a previous iteration to the observer AI agent 116 for evaluation. In an aspect, the agent manager AI agent 114 also receives the review result from the observer AI agent 116, highlighting any required refinements. Based on the review result, the story designer AI agent 108 refines the narrative storyline and the plurality of story descriptions to address identified feedback. The iterative refinement process continues until a predefined criterion is met, ensuring that the final storyline and story descriptions achieve the desired quality and alignment with the intent of the user. The predefined criterion includes either the review result from the observer AI agent 116 indicating that the narrative storyline and the plurality of story descriptions are approved, or a maximum iteration number being reached. The predefined criterion ensures that the iterative refinement process performed by the story designer AI agent 108, in coordination with the agent manager AI agent 114 and the observer AI agent 116, concludes effectively, balancing the quality of the storyline and descriptions with efficiency in processing.

The storyboard generator AI agent 110 is configured to receive the plurality of story descriptions from the story designer AI agent 108 and the reference video provided by the user. The storyboard generator AI agent 110 is configured to create a plurality of storyboard images that visually represent the story descriptions received from the story designer AI agent 108. In an aspect, each storyboard image presents the contents of one shot of the multi-shot video.

The storyboard generator AI agent 110 utilizes a specialized three-step pipeline to ensure that the visual elements, particularly character details, remain consistent across all storyboard images corresponding to the various shots of the narrative. The storyboard generator AI agent 110 ensures inter-shot consistency of the customized subject by employing the three-step pipeline. In an aspect, the inter-shot consistency refers to preserving consistent character details, appearance, and narrative flow across multiple shots in a video sequence. The three-step pipeline consists of generation, removal, and redrawing steps to preserve the consistency of character details of a customized subject across shots of the multi-shot video.

In an embodiment, the storyboard generator AI agent 110 extracts a subject image from the reference video and removes the background to isolate the customized subject of the multi-shot video. Using the plurality of story descriptions as a guide, the storyboard generator AI agent 110 generates a plurality of initial storyboard images. The plurality of initial storyboard images are generated by leveraging the textual story descriptions and, where applicable, reference video inputs provided as part of the story development process. The generated plurality of initial storyboard images depict the essential visual elements of each shot, including characters, actions, background scenes, and other relevant features described in the story script.

The storyboard generator AI agent 110 then applies a removal algorithm on the plurality of initial storyboard images to generate a plurality of subject masks within the plurality of initial storyboard images. During this step, a subject segmentation algorithm is applied to isolate specific elements of the storyboard images, such as character models and key objects, using subject masks for precise segmentation of the subjects, eliminating any visual inconsistencies or artifacts that might compromise the quality of the storyboard.

The storyboard generator AI agent 110 redraws the mask positions corresponding to the plurality of subject masks to generate the plurality of storyboard images. The redrawing process is tailored to maintain the accuracy and consistency of customized subject appearances, ensuring that character details, poses, and actions are rendered identically across all storyboard images. Finally, the storyboard generator AI agent 110 updates the storyboard images based on the review result made by the observer AI agent 116. This iterative process ensures the storyboard images meet the desired quality and consistency standards. The result, which highlights inconsistencies or inaccuracies in the visual elements, for example, is communicated to the storyboard generator AI agent 110 through the agent manager AI agent 114. The iterative refinement process ensures that the storyboard images align with the predefined approval criteria, offering a high-fidelity visualization of the narrative for subsequent production stages.

In an embodiment, the storyboard generator AI agent 110 is configured to update the plurality of storyboard images iteratively. This process involves coordination with the agent manager AI agent 114. Specifically, the storyboard generator AI agent 110 sends the storyboard images generated during a previous iteration to the observer AI agent 116 via the agent manager AI agent 114. Upon receiving the review result from the observer AI agent 116 via the agent manager AI agent 114, the storyboard generator AI agent 110 refines the storyboard images based on the feedback provided. This iterative process continues until a predefined criterion is met, ensuring the storyboard images are refined to align with quality and design objectives.

The video creator AI agent 112 is configured to receive the plurality of storyboard images finalized by the storyboard generator AI agent 110. In an embodiment, the video creator AI agent 112 is configured to apply the Latent Diffusion Model (LDM)-based image-to-video (I2V) generation model to generate the multi-shot video based on the plurality of story descriptions, the plurality of storyboard images, and the reference video. In an embodiment, the video creator AI agent 112 is configured to apply the LDM-based I2V generation model to update the multi-shot video based on a review result made by the observer AI agent 116. In another aspect, the LDM-based I2V generation model is trained using a training sample obtained from the reference video. The primary objective of the video creator AI agent 112 is maintaining the intra-shot consistency of the customized subject, ensuring high-quality and coherent visual representation throughout each scene.

In an embodiment, to generate the multi-shot video, the video creator AI agent 112 is configured to sample a noisy video from a Gaussian distribution and initialize a video creation pipeline by generating a baseline noisy video representation that serves as the foundation for subsequent refinement. The video creator AI agent 112 encodes the storyboard images into latent representations using a variational autoencoder (VAE). The encoding transforms the storyboard images into a compressed latent space, allowing the agent to efficiently manipulate and process the visual data while preserving key details. Subsequently, the video creator AI agent 112 combines latent representations derived from the storyboard images with the noisy video. The combined inputs are then processed through a 3D U-Net architecture. The 3D U-Net architecture applies advanced computational techniques employed to refine the video and align it with the intended visual and narrative elements. In an aspect, the 3D U-Net architecture includes a self-attention block, a temporal attention block, and a cross-attention block, and a text embedding and an image embedding are injected into the cross-attention block. In an aspect, a parameter is trained for each linear projection in the self-attention block, the temporal attention block, and the cross-attention block. In another aspect, the cross-attention block includes 16 cross-attention modules and 16 token embeddings. The 16 token embeddings are trained for the 16 cross-attention modules, and each token embedding is injected into one cross-attention module.

In an embodiment, the video creator AI agent 112 extracts the text embedding from the story descriptions and the image embedding from the storyboard images. The text embedding and the image embedding, representing narrative and visual features, are injected into the cross-attention blocks of the 3D U-Net architecture. The injection process ensures the preservation of character details, actions, and shot consistency throughout the video. Once the 3D U-Net architecture has processed the data, the video creator AI agent 112 employs the VAE to decode the refined latent data into a video format. The output of this step is the multi-shot video that visually embodies the story descriptions and the storyboard images, maintaining coherence across all shots.

In an embodiment, the LDM-based I2V generation model incorporates several components, including the VAE encoder and decoder, a text encoder, an image condition encoder, and the 3D U-Net architecture. The LDM-based I2V generation model generates the multi-shot video through a structured process. First, a noisy video is sampled from a Gaussian distribution. The plurality of storyboard images is then encoded via the VAE encoder to produce latent representations. These latent representations are concatenated with the noisy video and input into the 3D U-Net architecture. Simultaneously, a text embedding is extracted using the text encoder from the plurality of story descriptions. In contrast, an image embedding is derived using the image condition encoder from the plurality of storyboard images. Both the text embedding and the image embedding are injected into the 3D U-Net. The output of the 3D U-Net architecture is then fed into the VAE decoder, which generates the final multi-shot video at its output. This comprehensive process ensures that the generated video adheres to both the visual and narrative requirements defined by the storyboard images and the story descriptions.

In an aspect, a localization loss is applied on a cross-attention map during the training of the LDM-based I2V generation model to maximize a similarity inside a subject location.

In an embodiment, the video creator AI agent 112 is further configured to update the video based on review results provided by the observer AI agent 116. Feedback on various aspects such as visual fidelity, narrative alignment, and shot consistency is communicated to the video creator AI agent 112 via the agent manager AI agent 114. The video creator AI agent 112 incorporates the feedback into subsequent iterations of video refinement to ensure the final output meets the predefined quality criteria.

In an aspect, the agent manager AI agent 114 is configured to manage data flow between the story designer AI agent 108, the storyboard generator AI agent 110, the video creator AI agent 112, and the observer AI agent 116. By managing interactions and task execution, the agent manager AI agent 114 ensures seamless collaboration and efficient operation, enabling the framework to function orderly and effectively. Under the coordination of the agent manager AI agent 114, the user provides a textual prompt and a reference video as essential inputs for the storytelling video generation process.

In an embodiment, the agent manager AI agent 114 is configured to relay the generated outputs from one agent to another. For instance, the story scripts generated by the story designer AI agent 108 are transferred to the storyboard generator AI agent 110 for visualization. Similarly, the storyboard images are relayed to the video creator AI agent 112 for video production. The relaying process ensures that the data generated at each stage is accurately communicated to the subsequent processing agent, maintaining the logical flow and integrity of the system 100.

In an embodiment, the agent manager AI agent 114 is configured to manage the iterative update process by incorporating feedback provided by the observer AI agent 116. Specifically, the observer AI agent 116 evaluates the outputs (e.g., story scripts, storyboard images, or videos) and identifies areas requiring improvement or modification. The agent manager AI agent 114 communicates the feedback to the relevant agents, such as the story designer AI agent 108 or the video creator AI agent 112 and ensures that the necessary updates are performed iteratively until the predefined approval criteria are met.

In an aspect, the observer AI agent 116 acts as a quality controller within the system 100, reviewing outputs from each stage of video generation. The observer AI agent 116 identifies inconsistencies or areas for improvement and provides feedback to the relevant agents via the agent manager AI agent 114, enabling iterative refinement and ensuring the final video meets high-quality standards.

In an embodiment, the observer AI agent 116 is configured to assess the accuracy, coherence, and overall quality of the story script generated by the story designer AI agent 108. The observer AI agent 116 employs the multimodal LLM to analyze the narrative storyline and the accompanying story descriptions systematically. This analysis ensures that the generated story script adheres to the user-provided prompt and maintains consistency across all shots.

In an embodiment, the observer AI agent 116 is configured to evaluate the narrative storyline and descriptions for alignment with the intent of the user as expressed in the textual prompt. This evaluation process involves verifying that the thematic elements, character arcs, and scene details accurately reflect the requirements set forth by the prompt. Furthermore, the observer AI agent 116 ensures that the storyline is logically cohesive and that the descriptions for each shot are interconnected, creating a seamless flow of events.

In an embodiment, the observer AI agent 116 is further configured to generate the review result specifying whether the story script modifications are required. The review result includes detailed feedback, identifying any inconsistencies, inaccuracies, or deviations from the user-provided prompt. The feedback provided by the observer AI agent 116 is designed to guide the story designer AI agent 108 in refining the storyline and descriptions to meet the expectations of the user.

The observer AI agent 116 is also configured to communicate the review result to the agent manager AI agent 114. This communication initiates an iterative refinement process, wherein the agent manager AI agent 114 coordinates with the story designer AI agent 108 to address the feedback and update the story script accordingly. The iterative process continues until the story script satisfies a predefined approval criterion, ensuring the highest level of quality and user satisfaction, ensuring that the observer AI agent 116 performs a critical role in validating and refining the story script, thereby enhancing its coherence, alignment with user intent, and readiness for subsequent processing stages. In an aspect, the predefined approval criterion may include factors such as narrative coherence, alignment with the input of the user, consistency across descriptions, and adherence to specified objectives or user expectations.

In an embodiment, the agent manager AI agent 114 is further configured to apply a multimodal LLM to assess data generated by the story designer AI agent 108, the storyboard generator AI agent 110, and the video creator AI agent 112, and inform the agent manager AI agent 114 of a result of the assessment.

Figure 2:
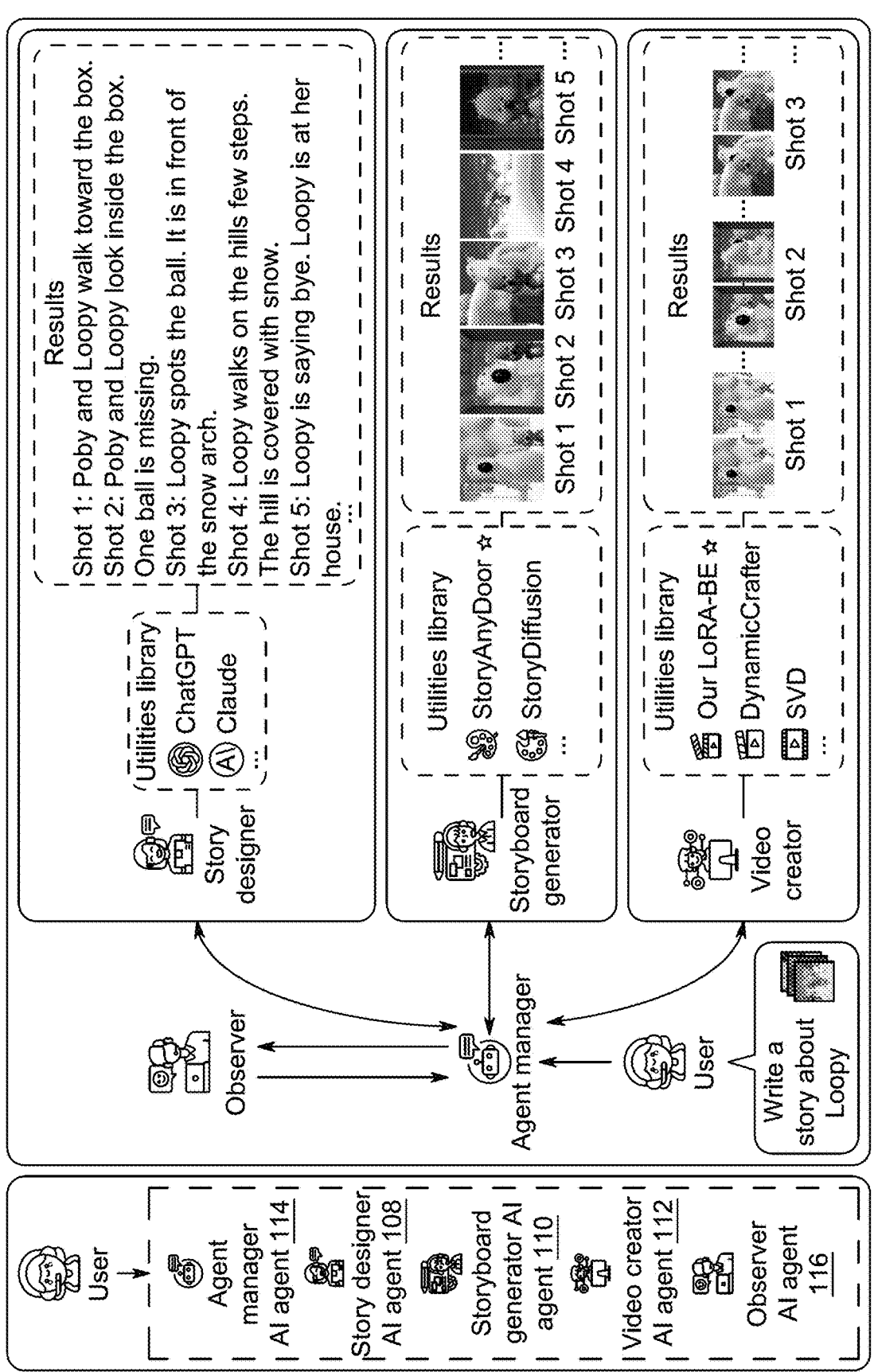
FIG. 2 illustrates an exemplary operational workflow of the system, according to certain embodiments.

FIG. 2 illustrates an exemplary operational workflow of the system 100, according to certain embodiments.

As illustrated in FIG. 2, the system 100 employs a collaborative framework involving five agents: the story designer AI agent 108, the storyboard generator AI agent 110, the video creator AI agent 112, the agent manager AI agent 114 and the observer AI agent 116. These five agents produce highly consistent multi-shot storytelling videos based on the inputs provided by the user.

The process employed by the system 100 to generate the multi-shot storytelling video is divided into three sequential and interdependent stages: storyline generation, storyboard creation, and video generation. Each stage is arranged by the agent manager AI agent 114 and incorporates feedback loops to ensure alignment with the user's requirements.

During the storyline generation stage, the agent manager AI agent 114 receives the textual prompt from the user and relays the received textual prompt to the story designer AI agent 108. The story designer AI agent 108 creates a detailed storyline consisting of the sequence of story descriptions, represented as $p=\{p_1, \ldots, p_N\}$, where N denotes the total number of shots in the final video. These story descriptions include critical narrative elements such as background scenes and protagonist actions, forming the foundation for the subsequent stages. The protagonist is the central character or main focus of a story, driving the narrative through their actions, decisions, and experiences. The observer AI agent 116, in collaboration with the agent manager AI agent 114, evaluates the storyline for coherence, accuracy, and alignment with the user-provided prompt. This stage involves iterative refinement until the observer signals approval, or a predefined maximum number of review cycles is reached. Once the storyline is approved, the process transitions to the storyboard creation stage.

In the storyboard creation stage, the agent manager AI agent 114 supplies the story descriptions p and the reference videos Vref (depicting the protagonist or related subjects) to the storyboard generator AI agent 110. Leveraging the StoryAnyDoor pipeline (the three-step storyboard generation pipeline discussed previously), the storyboard generator produces a series of storyboard images $I=\{I_1, \ldots, I_N\}$, visualizing the narrative described in p while ensuring visual consistency with $V_{ref}$. As in the previous stage, the observer AI agent 116 reviews the storyboard images to ensure they meet quality and coherence standards. The storyboard images are iteratively refined until they align with the desired criteria. Upon approval, the finalized storyboard images, along with the story descriptions and reference videos, are passed to the video generation stage.

The video generation stage utilizes the video creator AI agent 112 to synthesize a cohesive multi-shot storytelling video using the LoRA-BE (Latent Diffusion Model-based customized image-to-video method). The process involves encoding the storyboard images $I=\{I_1, \ldots, I_N\}$ and reference videos $V_{ref}$ into latent representations, integrating these with the story descriptions p, and processing the data through a 3D U-Net architecture. The video generation process ensures intra-shot consistency (within individual shots) and inter-shot consistency (across multiple shots), addressing critical challenges in multi-shot storytelling. Once the video is generated, the observer AI agent 116, under the guidance of the agent manager AI agent 114, evaluates the video for narrative alignment and visual fidelity. The iterative review ensures that the final output adheres to predefined quality standards.

FIG. 2 also describes two key features integrated into the workflow of the system 100. The first, StoryAnyDoor, is a pipeline utilized by the storyboard generator AI agent 110 to maintain inter-shot consistency in the storyboard images. The second, LoRA-BE, is a customized image-to-video generation method employed by the video creator AI agent 112 to enhance intra-shot consistency, ensuring a seamless and accurate representation of characters and scenes throughout the multi-shot video.

In an embodiment, the agent manager AI agent 114 serves as the central orchestrator in the Customized Storytelling Video Generation (CSVG) system, ensuring that multiple agents perform their tasks in a predefined sequence. Leveraging the capabilities of Large Language Models (LLMs), the agent manager AI agent 114 facilitates communication between various AI agents and selects the next agent for execution. For instance, the agent manager AI agent 114 generates a role message containing contextual information, such as completed tasks and the list of available agents. Based on this input, the LLM determines the subsequent agent, enabling seamless task coordination and efficient workflow management across the CSVG framework.

In an embodiment, the story designer AI agent 108 is responsible for creating immersive and narrative-rich story descriptions, which serve as the foundation for generating storyboards and storytelling videos. By utilizing LLMs, the story designer AI agent 108 generates a structured sequence of 'N' shots, each accompanied by descriptive elements. The story designer AI agent 108 generates a script by prompting the LLM with a role message that specifies requirements such as the number of shots, background descriptions, and protagonist actions, etc. The output comprises a sequence of n shots and their associated story descriptions p={p$_1$, . . . , p$_n$}, ensuring that the narrative structure aligns with the intent of the user.

In an embodiment, the observer AI agent 116 acts as a quality evaluator, reviewing the outputs generated by other agents, such as storyboards or videos, and providing feedback to the agent manager via the agent manager AI agent 114. Utilizing a multimodal LLM, the observer AI agent 116 assesses visual elements by scoring their quality and determining whether they meet predefined standards. If the outputs require refinement, the observer AI agent 116 signals the agent manager AI agent 114 to initiate iterations; otherwise, the observer AI agent 116 approves the results for further progression. For cases where automated evaluation is insufficient, human evaluation can supplement or replace the role of the observer AI agent 116 to ensure flexibility and maintain high-quality outputs throughout the CSVG process.

Figure 3:
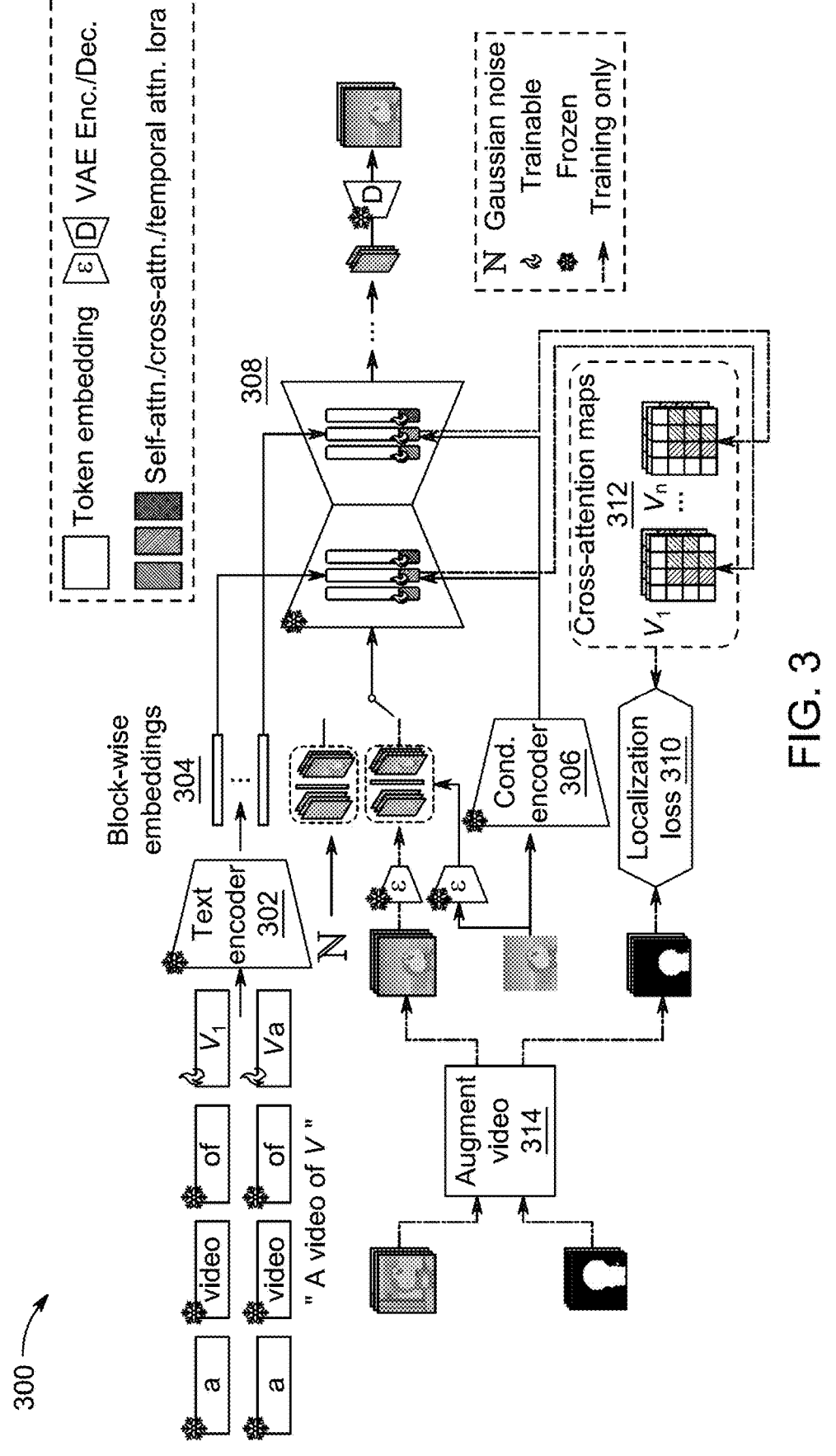
FIG. 3 illustrates a process flow for an image-to-video (I2V) generation, according to certain embodiments.

FIG. 3 illustrates a block diagram (300) for customized image-to-video (I2V) generation, according to certain embodiments. The system 100 integrates the storyboard generation process and the video creation process, combining the processes for removing and redrawing subjects with advanced latent diffusion modelling.

A text encoder 302 processes the input prompt, such as "A video of V," and encodes it into block-wise embeddings. The block-wise embeddings 304 are critical in guiding the model to generate videos that align with the provided textual descriptions.

A conditional encoder 306 encodes the input storyboard images, essentially frames, into latent representations 308. The latent representations 308 ensure that the generated video adheres closely to the visual cues and styles defined in the storyboard, maintaining consistency between the storyboard and the final output. The latent representations 308 refer to compact, encoded versions of input data that capture essential features and patterns, such as spatial details and stylistic elements while discarding unnecessary information. The latent representations 308 act as an intermediate form of input data that guides the video generation process, ensuring that the output data aligns closely with the visual and stylistic cues of the input storyboard, thereby maintaining consistency and smooth transitions between frames. The latent representations 308 ensure spatial and stylistic consistency, particularly when transitioning between frames, which is critical for smooth video generation.

The LDM comprises a variational autoencoder (VAE) for encoding and decoding the latent video representations. The LDM integrates self-attention, cross-attention, and temporal attention layers to process inputs efficiently. During training, Gaussian noise can be incorporated to augment video data, thereby enhancing the robustness and adaptability of the LDM, for example. Temporal attention ensures coherence between video frames, preventing visual artifacts or inconsistencies over time. Additionally, Gaussian noise improves diversity in training samples, making the model adaptable to a broader range of video generation scenarios.

Only the LoRA parameters in each attention block and the block-wise token embeddings are trained, while other components of the LDM remain frozen. The selective training ensures computational efficiency and enables the LDM to adapt effectively to specific subjects.

A localization loss 310 enforces the cross-attention maps to focus on the subject within the input images. The localization loss 310 prevents the LDM from overfitting to irrelevant background features, ensuring that subject consistency is maintained throughout the video generation process.

Cross-attention maps 312 are configured to visualize how the LDM attends to different parts of the input, such as the subject or the background. Fine-tuning the cross-attention maps 312 ensures that attention remains concentrated on the subject across frames, contributing to consistent visual representation.

The process begins with the storyboard generation, where text-to-image diffusion models, such as StoryDiffusion, generate an initial storyboard sequence based on detailed textual descriptions p={p$_1$, . . . , p$_N$}. For each storyboard, subject segmentation is performed using algorithms like LangSAM, producing subject masks M={m$_1$, . . . , m$_N$}. A user-provided subject image, with its background removed, is then used during the redrawing process to replace the subject in each mask M using Story AnyDoor, a model fine-tuned from AnyDoor with V$_{ref}$ fills the mask locations M with the customized subject, ensuring that the character details are preserved across storyboard frames.

In an embodiment, the LoRA-BE is introduced to enable customized I2V generation in the video domain. The LoRA-BE method is built on the LDM-based I2V framework, DynamCrafter (DC). The core modules include a Variational Autoencoder (VAE) with encoder E$_i$ and decoder D$_i$, a text encoder E$_t$, an image condition encoder E$_c$, and a 3D U-Net U incorporating self-attention, temporal attention, and cross-attention blocks. The inference process begins by sampling a noisy video z$_T$∈ R$^{F×C×h×w}$ from a Gaussian distribution N, where F represents the number of frames and C,h,w denotes the channel, height, and width dimensions of frame latent codes. The storyboard condition image I$_n$ is encoded via E$_i$ and concatenated with z$_{T-1}$ before being input to the U-Net U. Additionally, the condition image is projected by E$_c$ to extract image embeddings, which are injected alongside text embeddings into the U-Net through its cross-attention blocks. The U-Net outputs ε$_T$, used to iteratively denoise z$_T$ via the backward diffusion process B, recovering the latent video z$_{T-1}$ with the following formulation:

$$z_{t-1}^n = \mathcal{B}(\mathcal{U}([z_t^n; \mathcal{E}_i(I_n)], \mathcal{E}_T(p_n), \mathcal{E}_c(I_n)), z_t^n, t), \qquad (1)$$

where, [•;•] represents concatenation along the channel dimension.

In an embodiment, while the reference image provides visual details of the protagonist, pre-trained DC models struggle to maintain consistency for out-domain subjects. To overcome this, LoRA-BE enhances customization by introducing fine-tuning techniques inspired by Mix-of-Show. Two key adjustments are implemented: First is fine-tuning new token embeddings (e.g., <Miffy>) to capture in-domain subjects, and second is leveraging Low-Rank Adaptation (LoRA) to shift pre-trained models for out-domain identity preservation. Specifically, linear projections L(x)=W(x) in attention modules are modified with trainable parameters A and B to adjust projections as L(x)=Wx+ΔWx=Wx+BAx. This shifts the DC generation domain to accommodate new subjects after training. Additionally, new token embeddings are trained for each subject, with 16 block-wise embeddings injected into corresponding cross-attention modules of the U-Net (3D U-Net architecture).

In an embodiment, the fine-tuning process focuses on adapting LoRA parameters and subject token embeddings to the new subject. During training, reference video samples $v \in V_{ref}$ are projected into the latent space via the VAE encoder $z_0 = E(v)$. A noisy video $z_t$ is generated by applying the forward diffusion process F on $z_0$ with Gaussian noise $\epsilon \sim N(0,1)$. The U-Net is trained to predict the applied noise $\hat{\epsilon}$, enabling $z_t$ to be recovered to $z_0$ during the backward process. A localization loss ($L_{loc}$) is introduced to minimize interference from background details and focus on subject identity. This loss leverages similarity maps $D \in R^{F \times h \times w}$ between encoded subject token embeddings and latent video features, maximizing D values within subject regions defined by the mask m. The combined training objective is formulated as:

$$\mathcal{L} = \mathcal{L}_{ldm} + \mathcal{L}_{loc} = \qquad (2)$$

$$\|\epsilon - \mathcal{U}([z_t; z_0[1]], \mathcal{E}_T(p), \mathcal{E}_c(v[1]))\| - \frac{1}{F}\sum_f^F \text{mean}(D[f, m[f] = 1]).$$

In an embodiment, this dual-objective approach ensures that the trainable embeddings and LoRA parameters effectively focus on preserving the subject's identity, enabling consistent and customized animation for storytelling applications.

In an embodiment, the experiments were conducted for storytelling video generation incorporated key implementation details and were designed to evaluate the effectiveness of the LoRA-BE-based customization approach. The storyboard generation used AnyDoor as the redrawer, which was fine-tuned to adapt to new subjects. This fine-tuning process employed the Adam optimizer with an initial learning rate of $1 \times 10^{-5}$. Adam Optimizer is a type of optimizer used in the field of computer science that utilizes second-order information to enhance convergence and accelerate training. Each subject was represented by 4-5 reference videos, lasting 1-2 seconds each, and the fine-tuning process involved 20,000 steps. For training the Image-to-Video (I2V) model, DynamCrafter (DC) was used as the foundational framework. Only the LoRA and block-wise token embeddings (LoRA-BE) parameters were trained, utilizing the Adam optimizer with a learning rate of $1 \times 10^{-4}$ over 400 epochs. All experiments were executed on a V100 graphics processing unit (GPU) with 32 GB memory.

In an embodiment, the datasets used included two publicly available storytelling datasets: PororoSV and FlintstonesSV, which were provided with both story scripts and their corresponding videos. From PororoSV, 5 characters were selected as the customized subjects, while 4 characters were chosen from FlintstonesSV. To mimic practical scenarios, the reference videos for each subject were selected from a single episode to form the training set. For testing, 10 samples per subject, each consisting of 4 highly relevant shots, were curated. In addition to these datasets, an open-domain set comprising 8 subjects was introduced to assess generalization capabilities. Story descriptions for the open-domain set were generated.

In an embodiment, evaluation metrics were utilized to benchmark the performance across the datasets. For reference-based evaluation, metrics included Fréchet Video Distance (FVD), Peak Signal-to-Noise Ratio (PSNR), Structural Similarity Index Measure (SSIM), and Learned Perceptual Image Patch Similarity (LPIPS). These metrics assessed the generated videos against ground truth data. To evaluate the open-domain set without ground truth, non-reference metrics were employed, including Inception Score (IS), text-video consistency (Clip-score), semantic consistency (Clip-temp), Warping error, and Average flow (Flow-score). Notably, arrows next to the metric names indicated whether higher ($\uparrow$) or lower ($\downarrow$) values were preferable, with Flow-Score represented as a neutral metric ($\rightarrow$).

In an embodiment, the results of the experiments, summarized in Table 1, demonstrated the superior performance of the system (100) compared to baseline approaches (SVD and TI-SparseCtrl) on both PororoSV and FlintstonesSV datasets. The PororoSV dataset comprises video scenes featuring characters and stories from the animated series 'Pororo the Little Penguin', used to benchmark storytelling video generation methods. The FlintstonesSV dataset includes scenes inspired by 'The Flintstones', containing diverse character interactions and settings for evaluating visual storytelling quality. These results validate the efficacy of LoRA-BE and the customized I2V training pipeline in generating high-quality storytelling videos.

TABLE 1

| Comparison of storytelling video generation results on PororoSV and FlintstonesSV datasets. | | | | | |
|---|---|---|---|---|---|
| Dataset | Method | FVD $\downarrow$ | SSIM $\uparrow$ | PSNR $\uparrow$ | LPIPS $\downarrow$ |
| PororoSV | SVD | 2634.01 | 0.5584 | 14.2813 | 0.3737 |
| | TI-Sparsectrl | 4209.8 | 0.5042 | 12.2749 | 0.5646 |
| | System 100 | 2070.56 | 0.6995 | 17.5104 | 0.2535 |
| FlintstonesSV | SVD | 1864.91 | 0.446 | 14.5968 | 0.4023 |
| | TI-Sparsectrl | 3277.96 | 0.5571 | 14.7053 | 0.4958 |
| | System 100 | 991.37 | 0.6700 | 18.1169 | 0.2490 |

In an embodiment, evaluation on public datasets was conducted using the PororoSV and FlintstonesSV datasets, which include story descriptions and corresponding ground-truth videos. During the testing process, an initial storyboard was generated with a consistent background derived from the first frame of each video, excluding the subject. The storyboard generator AI agent 110 then refined this storyboard to produce the final version. The video creator AI agent 112 subsequently animated the storyboard to create the final video of the subject. The evaluation framework highlighted the limitations of one-stage methods, which directly generate storytelling videos from descriptions but result in significant background discrepancies compared to ground-truth videos.

In an embodiment, to enable fair comparisons, two benchmark methods were employed alongside the proposed method: SVD, an open-source tool commonly used for image animation, and TI-SparseCtrl, which combines the SparseCtrl customization generation method with the Text Inversion (TI) technique. Quantitative results in Table 1 illustrate the superiority of the system 100, which consistently outperforms the benchmark methods across multiple metrics, including FVD and LPIPS scores. The metrics in Table 1 demonstrate improved video quality and human perceptual alignment. The enhanced SSIM score further emphasizes the closer alignment of the generated videos to the ground truth, showcasing better consistency in character representation.

Figure 4:
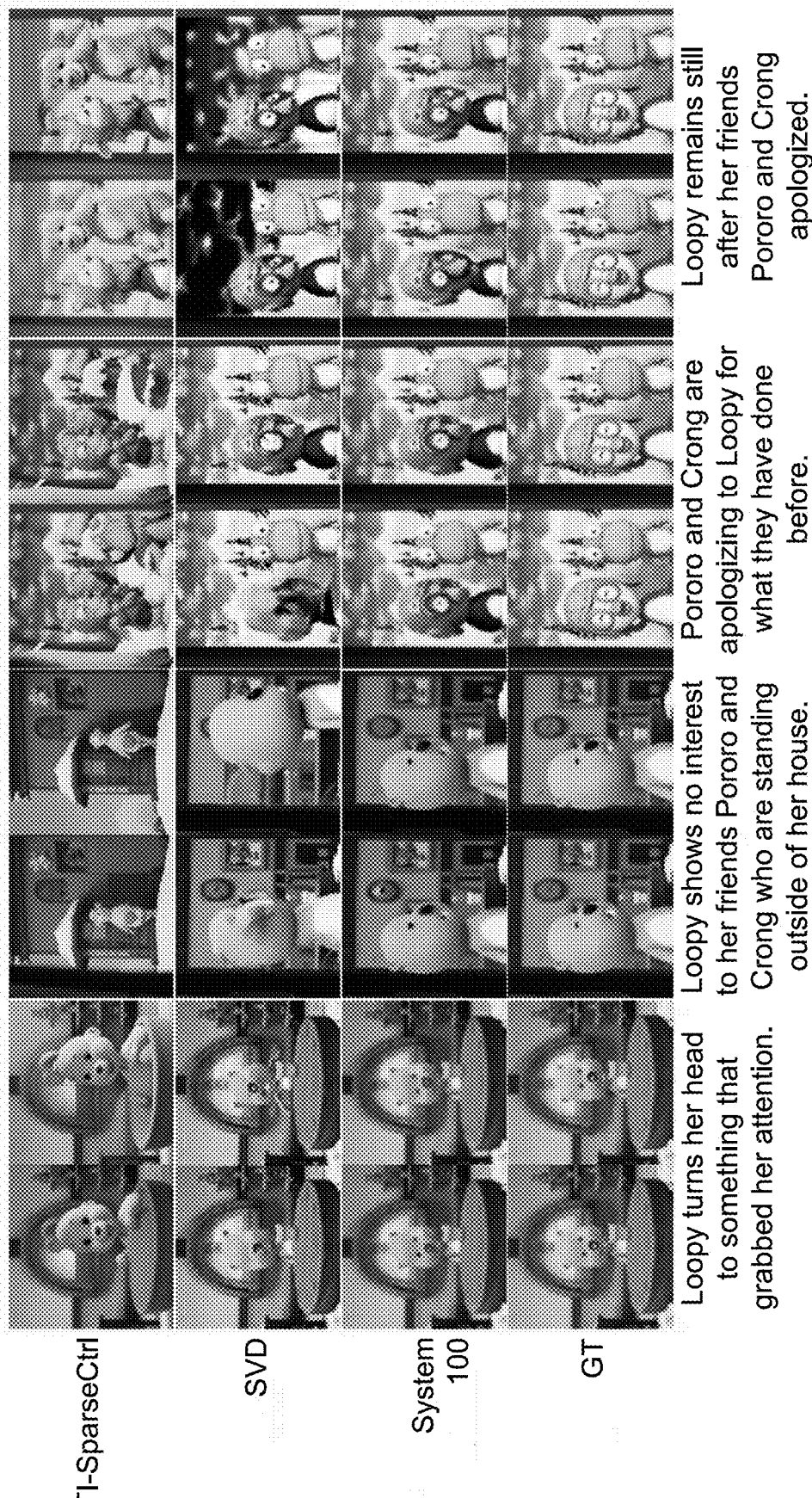
FIG. 4 illustrates an exemplary comparison of a plurality of existing methods with the system, according to certain embodiments.

In an embodiment, FIG. 4 provides an exemplary comparison 400 of the plurality of existing methods with the system 100, according to certain embodiments, such as TI-SparseCtrl, Story Video Diffusion (SVD), and Ground Truth (GT) and the present system 100. The TI-SparseCtrl is a storytelling video generation method that relies on sparse control signals to guide the creation process. While the TI-SparseCtrl offers a structured approach to generating videos, the TI-SparseCtrl often struggles with maintaining consistent character traits and visuals across multiple frames. This limitation leads to fragmented narratives that fail to convey cohesive storytelling. The SVD employs a diffusion-based approach to generate storytelling videos. The SVD achieves some improvements in visual quality and storytelling alignment but exhibits significant inconsistencies within individual shots. These inconsistencies undermine the narrative flow and visual coherence, making it less reliable for complex storytelling tasks. The GT refers to human-created reference videos that serve as benchmarks for evaluating the performance of automated storytelling video generation methods. These videos set a high standard for consistency, fidelity to story descriptions, and visual quality, providing an ideal outcome against which generated results can be compared. The first row shows results from TI-SparseCtrl, which fails to capture consistent character traits across frames. The second row, featuring results from SVD, highlights significant inconsistencies within individual shots. The third row, corresponding to the system 100, demonstrates superior performance, with results visually aligned with the ground truth, displayed in the fourth row. The bottom text in each column presents the story descriptions, offering further context for understanding the generated results. The generated results affirm the efficacy of the system 100 in preserving consistency and faithfully adhering to story descriptions.

In an embodiment, qualitative comparisons, as visualized in FIG. 4, further validate the effectiveness of the system 100. The results highlight the ability of the system 100 to maintain both inter-shot and intra-shot consistency, unlike the benchmark methods. TI-SparseCtrl, despite leveraging Text Inversion, struggles with maintaining consistency across shots, leading to noticeable variations in character representation. On the other hand, SVD demonstrates better inter-shot consistency but fails within individual shots, as evidenced by significant variations in the second and third shots. The system 100 effectively preserves inter-shot and intra-shot consistency, closely approximating the ground truth. This qualitative analysis underscores the robustness of the proposed approach in generating storytelling videos with superior fidelity and consistency.

Figure 5:
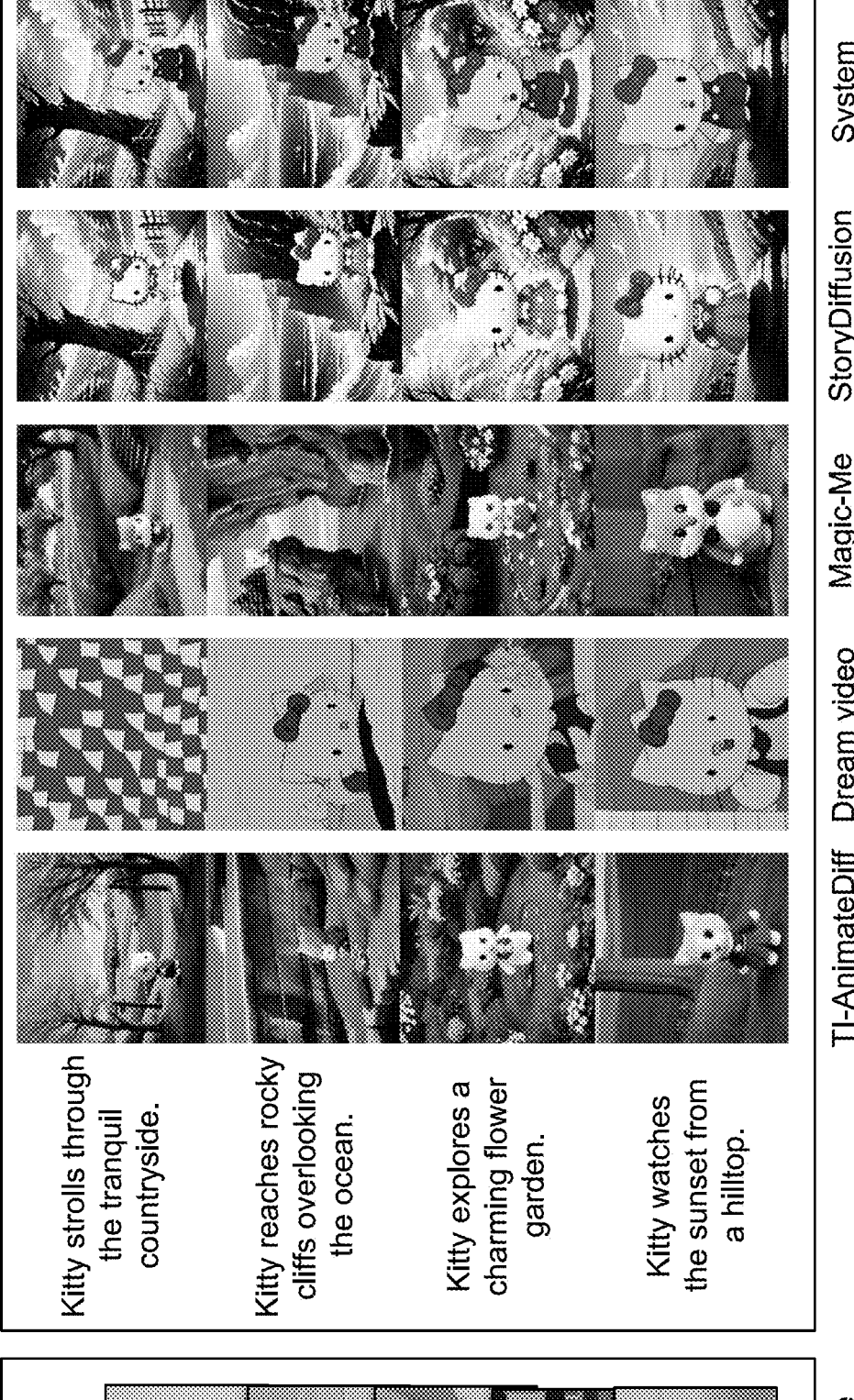
FIG. 5 illustrates another exemplary comparison of the plurality of existing methods with the system, according to certain embodiments.

FIG. 5 illustrates another exemplary comparison 500 of the plurality of existing methods with the system 100, according to certain embodiments.

In an embodiment, evaluation on open-domain subjects was performed to assess storytelling video generation methods using diverse and unconstrained datasets. As visualized in FIG. 5, the present disclosure demonstrates superior performance in maintaining the consistency of the reference subject across shots. Other methods/techniques such as TI-AnimateDiff, Dream Video, Magic-Me, and StoryDiffusion fail to achieve this consistency. Specifically, the subject generated by TI-AnimateDiff differs between the third and fourth shots, while Dream Video produces unstable and unnatural content. Furthermore, Magic-Me fails to maintain even intra-shot consistency, as observed in the fourth shot of column 1. By contrast, the system 100 effectively preserves the reference subject's details, including clothing, enhancing both inter-shot and intra-shot consistency.

In an embodiment, the storyboard generation pipeline leverages the storyboard of StoryDiffusion, replacing subjects with reference subjects using a removal and redrawing strategy ensuring that the generated videos maintain a high degree of consistency with the referenced image, a critical aspect for storytelling video generation. The pipeline also stores subject information in trainable parameters, further aiding intra-shot consistency. This collaborative multi-agent framework, which includes the storyboard generator AI agent 110 and the video creator AI agent 112, ensures a cohesive storytelling experience.

In an embodiment, quantitative comparisons were conducted to evaluate text-video alignment and other metrics, as presented in Table 2. The present disclosure achieves the highest CLIP-score (0.2053), outperforming other methods like TI-SparseCtrl, SVD, and Dream Video, demonstrating superior text-video alignment. The CLIP-score is a metric used to evaluate the quality and relevance of short video clips. Moreover, the method achieves comparable performances in other metrics, such as IS (2.6346) and CLIP-temp (0.9985), which indicate high semantic consistency. The warping error (0.0184) is among the lowest, signifying minimal inconsistencies in the generated frames. The results underscore the ability of the present disclosure to ensure high consistency while maintaining competitive video quality compared to state-of-the-art methods.

In an embodiment, the findings from both qualitative and quantitative analyses indicate that the collaboration of multi-agents described in the present disclosure presents a promising direction for achieving superior results in storytelling video generation. The effective integration of storyboard generation and video creation ensures that the generated videos align closely with both the textual descriptions and the reference subjects.

TABLE 2

| Method | Comparison results of storytelling video generation on the open-domain dataset. | | | | | |
|---|---|---|---|---|---|---|
| | System 100 | TI-Sparsectrl | SVD | TI-AnimateDiff | Dream Video | Magic-Me |
| IS ↑ | 2.6346 | 2.4184 | 2.3831 | 2.4539 | 3.4421 | 2.3989 |
| CLIP-score ↑ | 0.2053 | 0.1963 | 0.2013 | 0.2023 | 0.1843 | 0.2003 |
| CLIP-temp ↑ | 0.9985 | 0.9969 | 0.9959 | 0.9990 | 0.9963 | 0.9992 |
| Warping | 0.0184 | 0.0189 | 0.0264 | 0.0043 | 0.0208 | 0.0048 |

TABLE 2-continued

| | | | | | | |
|---|---|---|---|---|---|---|
| | | Comparison results of storytelling video generation on the open-domain dataset. | | | | |
| Method | System 100 | TI-Sparsectrl | SVD | TI-AnimateDiff | Dream Video | Magic-Me |
| error ↓ Flow-score → | 2.4332 | 2.6334 | 5.2117 | 1.8184 | 5.1140 | 1.4092 |

In an embodiment, ablation studies were conducted to evaluate the effectiveness of the RoLA-BE strategy for generating storytelling videos, specifically on the FlintstonesSV dataset, using methods like DC on the first row and GT on the third row.

Figure 6:
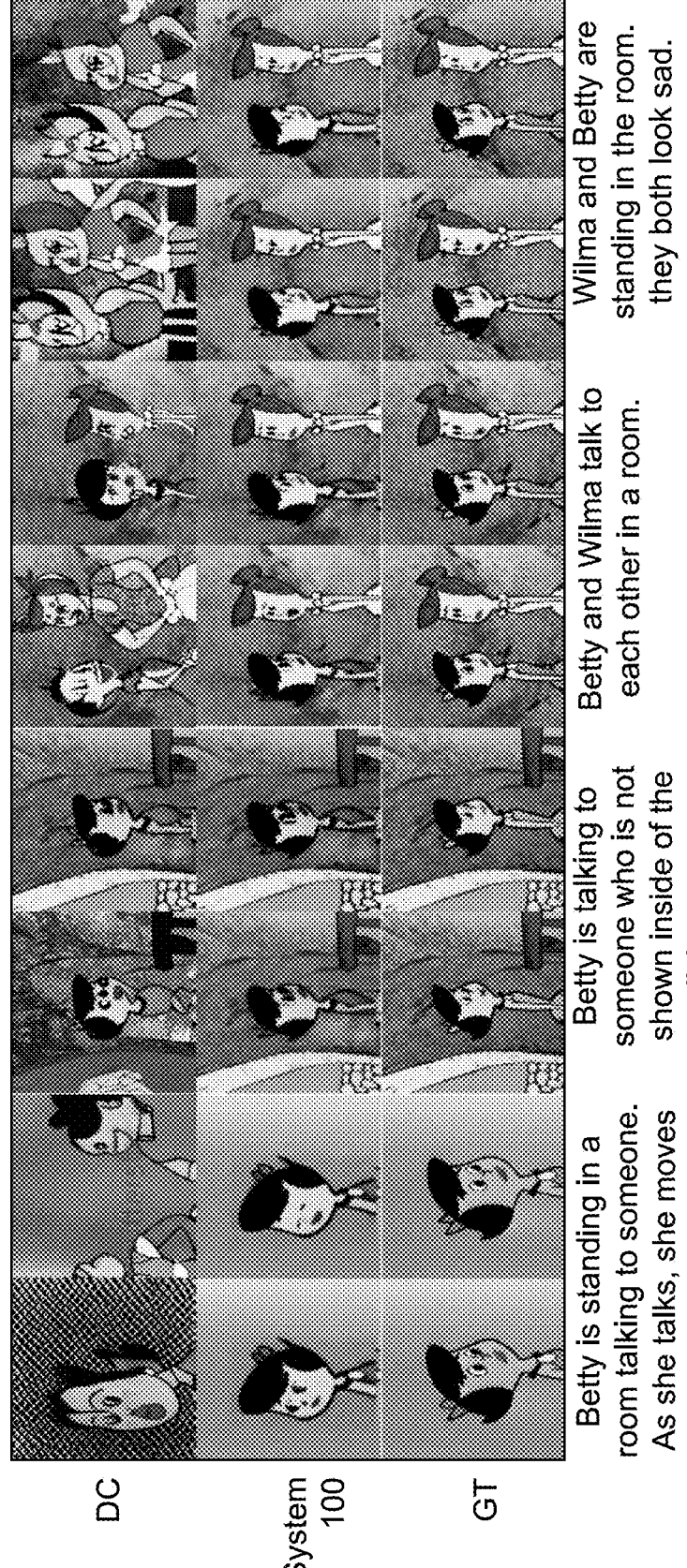
FIG. 6 illustrates another exemplary comparison of the plurality of existing methods with the system, according to certain embodiments.

FIG. 6 illustrates another exemplary comparison 600 of the plurality of existing methods with the system 100, according to certain embodiments.

FIG. 6 illustrates the results of this evaluation. When employing simple fine-tuning techniques (as seen in the first row of FIG. 6), inconsistency persists between shots, leading to a noticeable mismatch with the ground truth (the third row). In contrast, the system 100 integrates the RoLA-BE strategy, achieving significantly improved intra-shot and inter-shot consistency, which aligns more closely with the ground truth.

In an embodiment, the system 100 evaluated the effectiveness of the customized I2V generation enabled by the RoLA-BE strategy. The baseline involved fine-tuning the image injection module of DynamiCrafter (DC) using reference videos to enhance customization capabilities. Table 3 and FIG. 6 indicate that lacking the proposed RoLA-BE component, the baseline approach fails to preserve intra-shot consistency, resulting in lower scores for video quality and human perception. The omission of RoLA-BE leads to noticeable inconsistencies in generated frames, undermining the storytelling quality.

In an embodiment, integrating the RoLA-BE strategy within the present disclosure demonstrated substantial improvements in video generation. The approach enhanced inter-shot and intra-shot consistency and delivered high-quality videos with superior alignment to reference subjects. The findings confirm the efficacy of the proposed method in animating customized subjects, offering significant advantages over baseline techniques and highlighting the pivotal role of RoLA-BE in achieving storytelling consistency.

Figure 7:
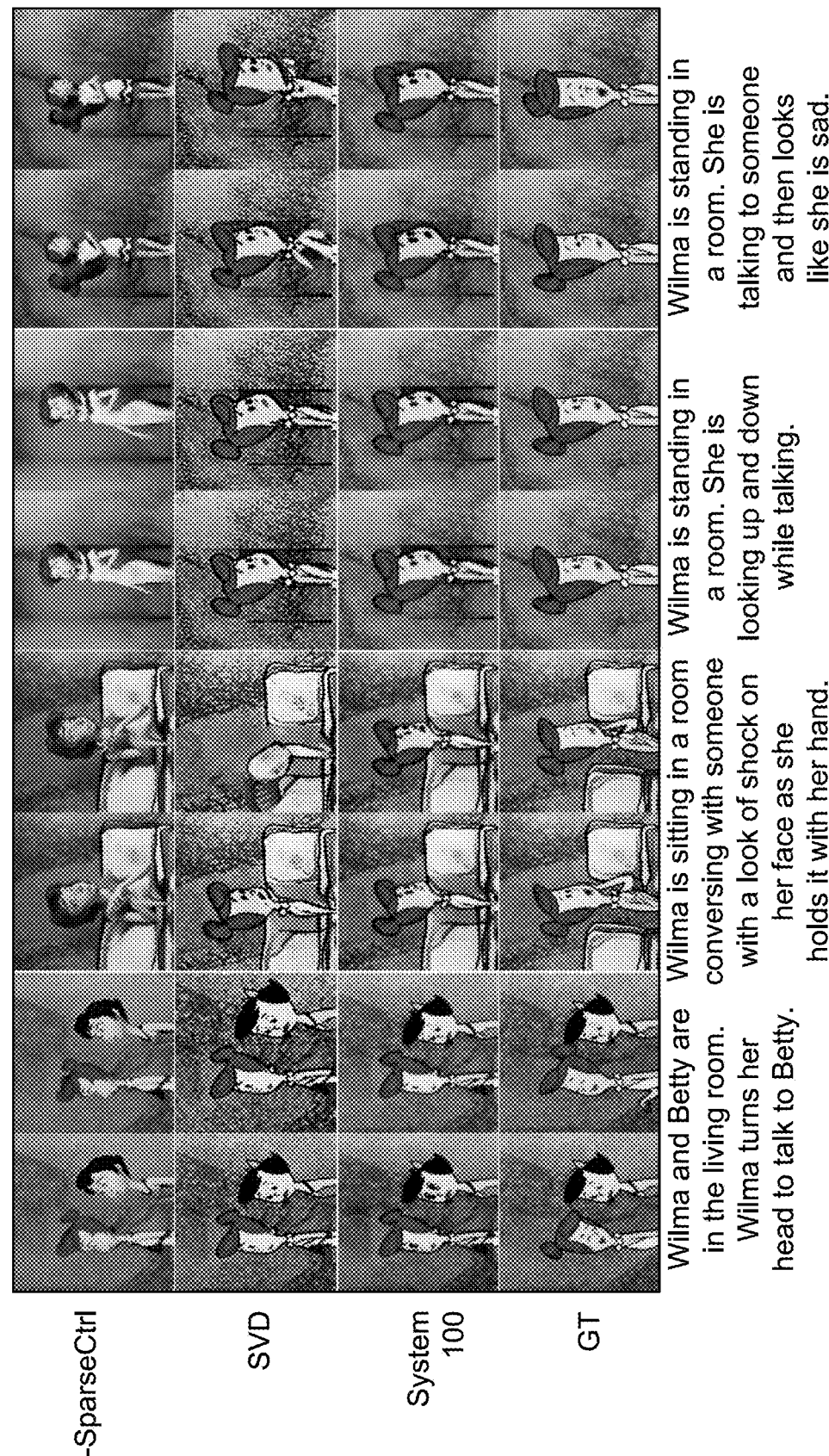
FIG. 7 illustrates another exemplary comparison of the plurality of existing methods with the system, according to certain embodiments.

As illustrated in FIG. 7, the present disclosure, enhanced with the LoRA-BE strategy, demonstrated results that closely aligned with the ground truth while maintaining superior temporal consistency of subjects compared to other methods. This evaluation highlighted the effectiveness of the method in generating storytelling videos with both visual quality and temporal coherence.

Figure 8:
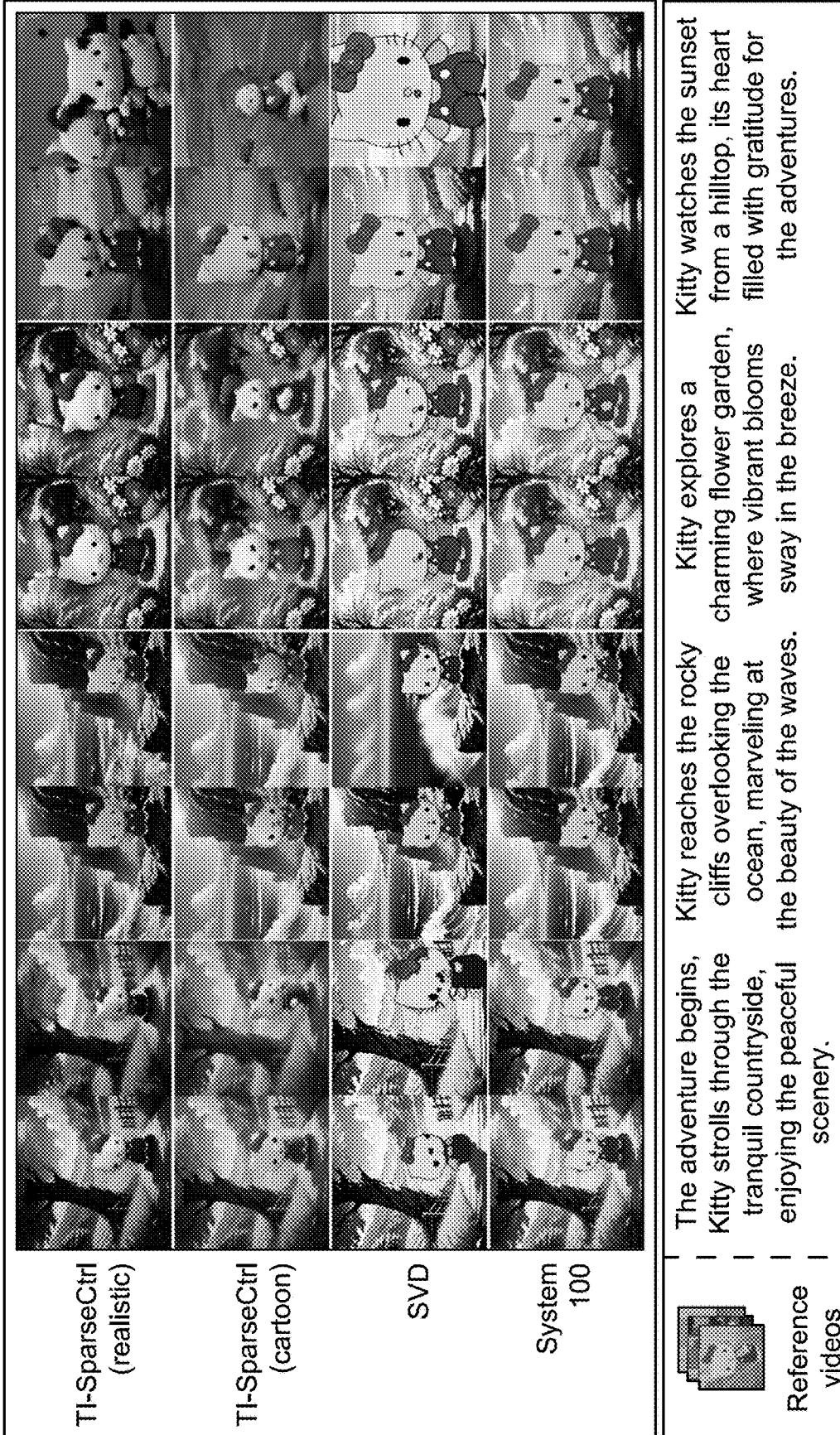
FIG. 8 illustrates another exemplary comparison of the plurality of existing methods with the system, according to certain embodiments.
Figure 9:
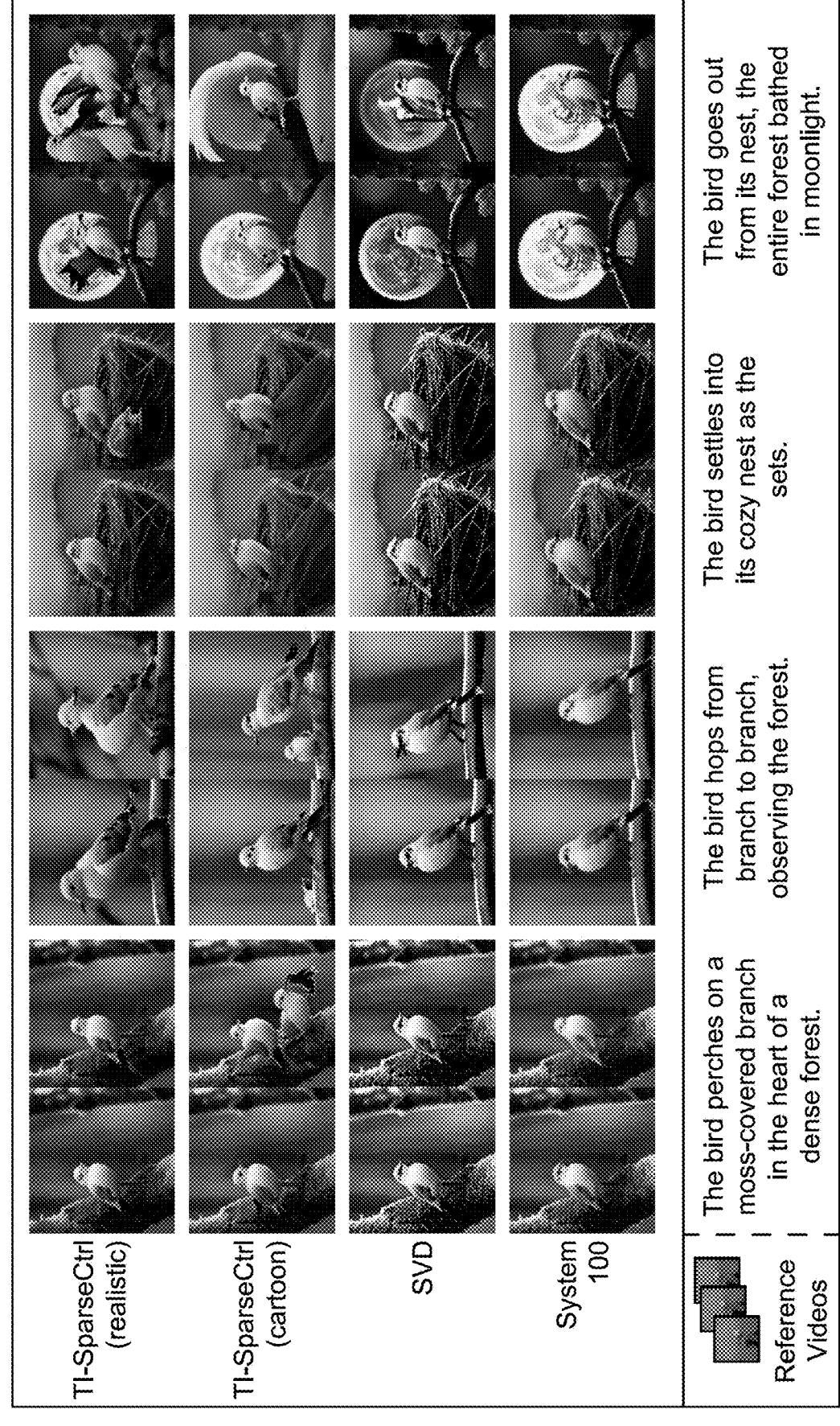
FIG. 9 illustrates another exemplary comparison of the plurality of existing methods with the system, according to certain embodiments.

FIGS. 8 and 9 illustrate another exemplary comparison 800, 900 of the plurality of existing methods with the system 100, according to certain embodiments.

In an embodiment, additional storytelling video generation experiments were performed on open-domain subjects to compare the method described in the present disclosure with SVD and TI-SparseCtrl. As visualized in FIGS. 8 and 9, TI-SparseCtrl showed significant failures in maintaining consistency across all shots, with subjects changing notably in subsequent shots (e.g., the final shots for multiple subjects). In contrast, the present disclosure effectively preserved temporal consistency throughout the story sequences, capturing detailed features of referenced subjects, such as clothing in cartoon characters (e.g., Kitty) and the appearance of real-world subjects (e.g., a bird). Although SVD performed relatively well for real-world subjects, such as the bird, the generated movements were less synchronized with the text descriptions. The system 100 outperformed SVD by producing more vivid and engaging videos that adhered better to the story's descriptions.

Figure 10:
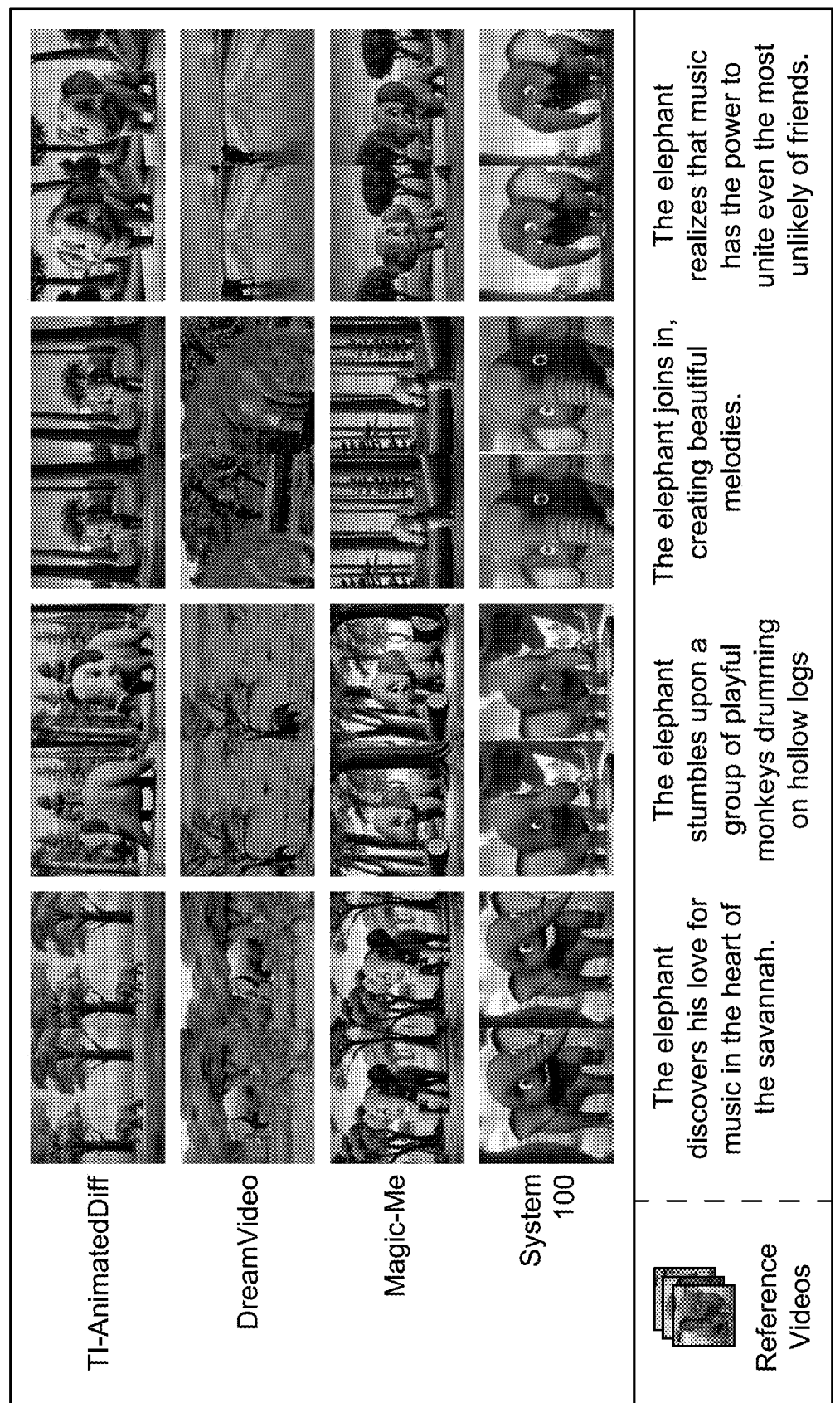
FIG. 10 illustrates another exemplary comparison of the plurality of existing methods with the system, according to certain embodiments.

FIG. 10 illustrates another exemplary comparison 1000 of the plurality of existing methods with the system 100, according to certain embodiments.

In an embodiment, a comparison of the method with state-of-the-art customization T2V techniques on an open-domain subject (e.g., a cartoon elephant) is shown in FIG. 10. Methods such as TI-AnimatedDiff failed to maintain inter-shot consistency, where the subject in one shot differed from earlier shots. Dream Video occasionally failed to

TABLE 3

| | | | | | |
|---|---|---|---|---|---|
| | | Ablation studies of video generation on PororoSV and FlintstonesSV datasets. | | | |
| Dataset | Method | FVD ↓ | SSIM ↑ | PSNR ↑ | LPIPS ↓ |
| PororoSV | DC-finetuning | 2251.47 | 0.4479 | 13.5322 | 0.4878 |
| | System 100 | 2070.56 | 0.6995 | 17.5104 | 0.2535 |
| FlintstonesSV | DC-finetuning | 3753.91 | 0.3357 | 10.4159 | 0.6042 |
| | System 100 | 991.37 | 0.6700 | 18.1169 | 0.2490 |

In an embodiment, more evaluations on public datasets were conducted to assess storytelling video generation performance, specifically using the FlintstonesSV dataset. Existing I2V methods, such as SVD and TI-SparseCtrl, were compared with the approach in the present disclosure.

FIG. 7 illustrates another exemplary comparison 700 of the plurality of existing methods with the system 100, according to certain embodiments.

generate the subject altogether, and Magic-Me struggled with inter-shot consistency as well. In contrast, the approach in the present disclosure successfully preserved the identity of the reference subject across all shots, ensuring high levels of both inter-shot and intra-shot consistency. These results validate that the storyboard generator AI agent 110 and the video creator AI agent 112 storing subject information described in the present disclosure significantly enhance the temporal and spatial coherence of storytelling videos.

In an embodiment, further storytelling video generation ablation studies were conducted using the PororoSV dataset to evaluate the effectiveness of the proposed RoLA-BE strategy. The method in the present disclosure incorporated both DC and the proposed RoLA-BE strategy.

Figure 11:
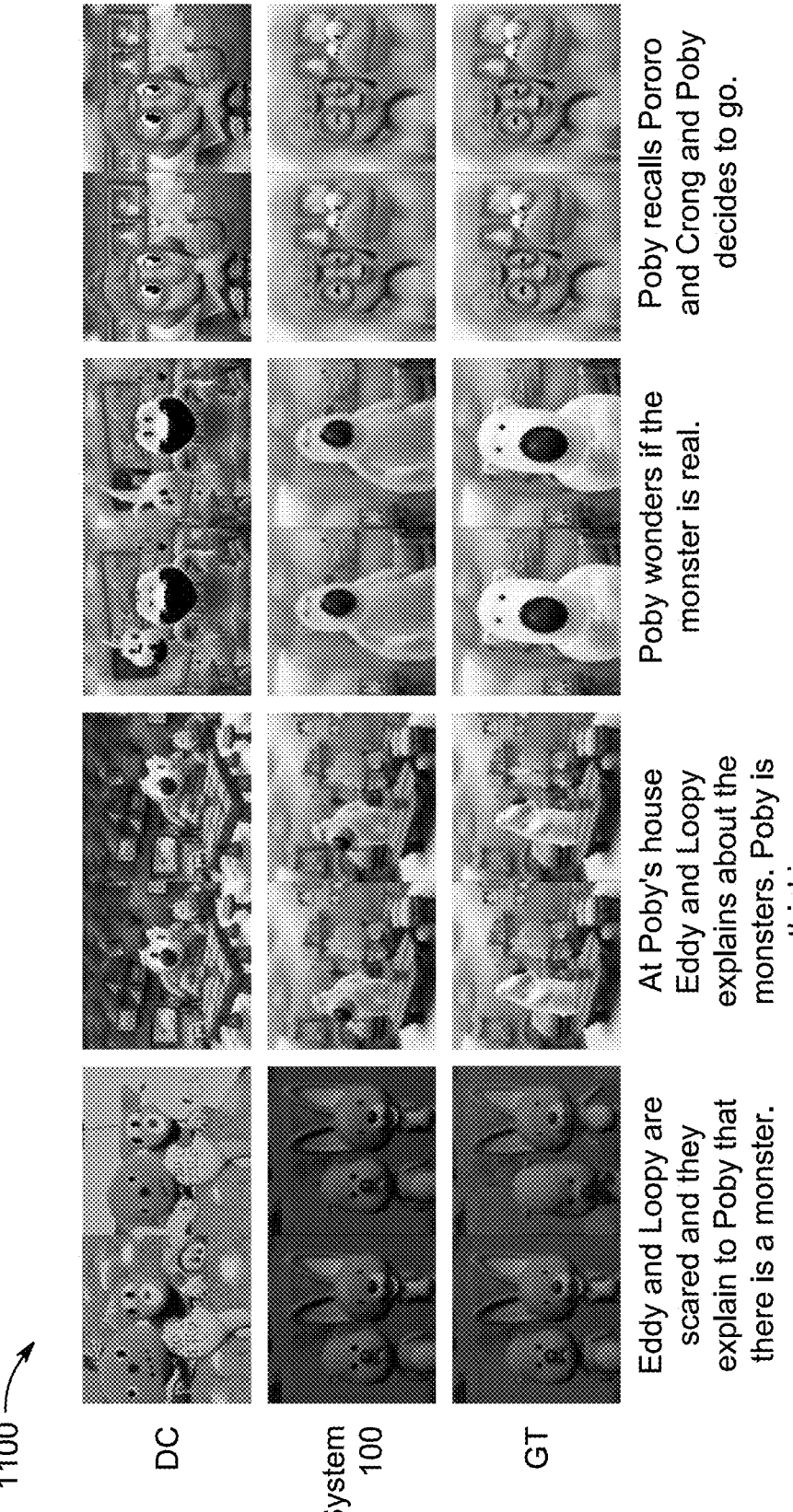
FIG. 11 illustrates another exemplary comparison of the plurality of existing methods with the system, according to certain embodiments.

FIG. 11 illustrates another exemplary comparison 1100 of the plurality of existing methods with the system 100, according to certain embodiments.

As illustrated in FIG. 11, DC, even when fine-tuned with reference data, could not generate fully customized subjects. In contrast, the approach described in the present disclosure produced results that closely matched the ground truth while aligning well with the script, demonstrating the enhanced customization capabilities of the proposed methodology.

In an embodiment, the potential social impact of storytelling video synthesis was also considered. While the technology holds significant promise for applications in fields like education and advertising, it shares vulnerabilities with general video synthesis techniques, such as the potential for misuse in creating deepfakes. Additionally, concerns regarding ownership and copyright infringement may arise from the use of such methods. To mitigate these risks, employing forensic analysis and other manipulation detection techniques is proposed as a viable solution to address the negative implications of storytelling video synthesis.

Figure 12:
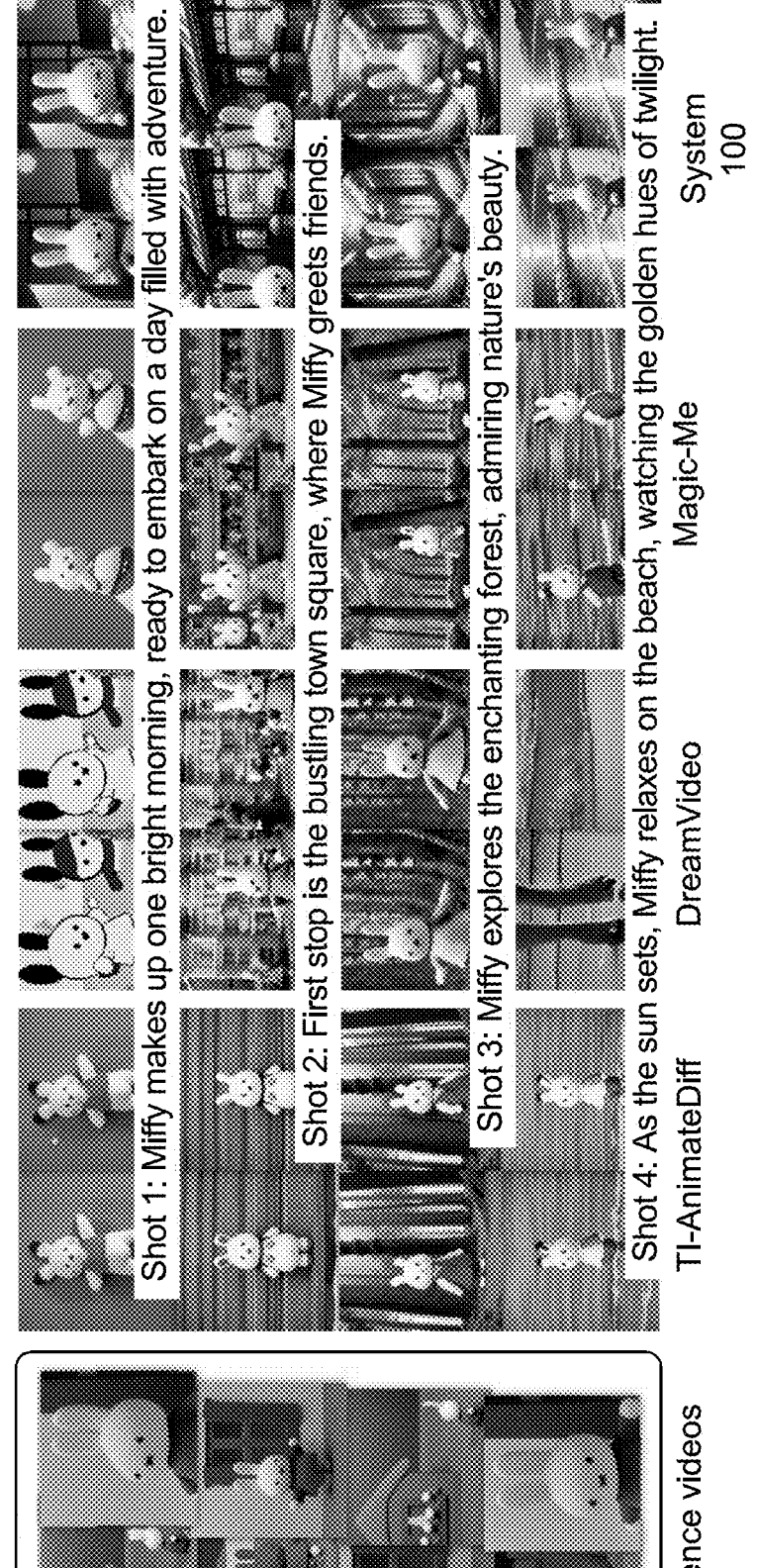
FIG. 12 illustrates another exemplary comparison of the plurality of existing methods with the system, according to certain embodiments.

FIG. 12 illustrates another exemplary comparison 1200 of the plurality of existing methods with the system 100, according to certain embodiments.

In an embodiment, the present disclosure enhances the production of highly consistent video outputs. The present disclosure improves the inter-shot consistency of the reference subject, while the RoLA-BE strategy further strengthens intra-shot consistency during the animation process. Qualitative and quantitative evaluations validate the superior consistency of the framework described in the present disclosure.

The first embodiment is illustrated with respect to FIGS. 1-3. The first embodiment describes the system 100 for performing artificial intelligence (AI)-based customized storytelling video generation. The system 100 is configured to include a story designer AI agent 108, a storyboard generator AI agent 110, a video creator AI agent 112, an agent manager AI agent 114, and an observer AI agent 116. Based on a textual prompt and a reference video provided by a user of the system 100, and under the coordination of the agent manager AI agent 114, the story designer AI agent 108, the storyboard generator AI agent 110, the video creator AI agent 112, and the observer AI agent 116 cooperate to generate a multi-shot video. The multi-shot video depicts a story of a customized subject presented in the reference video. Each of the story designer AI agent 108, the agent manager AI agent 114, and the observer AI agent 116 is based on a Large Language Model (LLM). The storyboard generator AI agent 110 uses a three-step storyboard generation pipeline, including a generation step, a removal step, and a redrawing step, to preserve the consistency of character details of the customized subject across shots of the multi-shot video. Additionally, the video creator AI agent 112 is based on a Latent Diffusion Model (LDM)-based Image-to-Video (I2V) generation model configured to preserve the consistency of the character details of the customized subject within each shot of the multi-shot video.

In an aspect, the story designer AI agent 108 is configured to apply an LLM to generate a story script based on the textual prompt. The generated story script includes a plurality of story descriptions, with each story description corresponding to one shot of the multi-shot video.

In an aspect, the story designer AI agent 108 is further configured to generate the story script by identifying a story requirement from the textual prompt, generating a narrative storyline based on the story requirement, decomposing the narrative storyline into multiple shots, generating the plurality of story descriptions corresponding to these shots, and updating the narrative storyline and the story descriptions based on a review result made by the observer AI agent 116.

In an aspect, each story description of the plurality of story descriptions describes, for a corresponding shot of the multi-shot video, details including a character shown in the shot, an action of the character, a character region in the shot, a background scene, a shot type, and a shot motion.

In an aspect, the story designer AI agent 108 is further configured to iteratively update the narrative storyline and the plurality of story descriptions. The story designer AI agent 108 performs this by, via the agent manager AI agent 114, sending the narrative storyline and the plurality of story descriptions generated during a previous iteration to the observer AI agent 116, receiving the review result from the observer AI agent 116, and refining the narrative storyline and the story descriptions based on the review result until a predefined criterion is met.

In an aspect, the predefined criterion is defined as either the review result from the observer AI agent 116 indicating that the narrative storyline and the plurality of story descriptions are approved, or a maximum iteration number being reached.

In an aspect, the storyboard generator AI agent 110 is configured to generate a plurality of storyboard images based on the plurality of story descriptions and the reference video. Each storyboard image presents the contents of one shot of the multi-shot video.

In an aspect, the storyboard generator AI agent 110 generates the plurality of storyboard images by obtaining, based on the reference video, a subject image with the background removed, generating a plurality of initial storyboard images based on the plurality of story descriptions, applying a removal algorithm to perform subject segmentation to create subject masks, redrawing based on the subject image and mask positions to create the storyboard images, and updating the storyboard images based on a review result made by the observer AI agent 116.

In an aspect, the storyboard generator AI agent 110 iteratively updates the plurality of storyboard images by sending the storyboard images generated during a previous iteration to the observer AI agent 116, receiving the review result from the observer AI agent 116, and refining the storyboard images based on the review result until a predefined criterion is met.

In an aspect, the video creator AI agent 112 applies the LDM-based I2V generation model to generate the multi-shot video based on the plurality of story descriptions, the plurality of storyboard images, and the reference video, and to update the multi-shot video based on a review result made by the observer AI agent 116.

In an aspect, the LDM-based I2V generation model includes a variational autoencoder (VAE) encoder and decoder, a text encoder, an image condition encoder, and a 3D U-Net. The LDM-based I2V generation model is further configured to generate the multi-shot video by sampling a noisy video from a Gaussian distribution, encoding the storyboard images via the VAE encoder to obtain latent representations, concatenating these latent representations with the noisy video for input into the 3D U-Net, extracting a text embedding via the text encoder, extracting an image embedding via the image condition encoder, injecting these embeddings into the 3D U-Net, feeding the output of the 3D U-Net into the VAE decoder, and obtaining the multi-shot video as the output.

In an aspect, the LDM-based I2V generation model includes a variational autoencoder encoder and decoder, a text encoder, an image condition encoder, and a 3D U-Net. The LDM-based I2V generation model is configured to generate the multi-shot video by sampling a noisy video from a Gaussian distribution, encoding the plurality of storyboard images via the variational autoencoder encoder to obtain latent representations of the plurality of storyboard images, concatenating the latent representations with the noisy video as input into the 3D U-Net, extracting a text embedding via the text encoder from the plurality of story descriptions, extracting an image embedding via the image condition encoder from the plurality of storyboard images, injecting the text embedding and the image embedding into the 3D U-Net, feeding an output of the 3D U-Net into the variational autoencoder decoder, and obtaining the multi-shot video at an output of the variational autoencoder decoder.

In an aspect, the 3D U-Net includes a self-attention block, a temporal attention block, and a cross-attention block, and the text embedding and the image embedding are injected into the cross-attention block.

In an aspect, a parameter is trained for each linear projection in the self-attention block, the temporal attention block, and the cross-attention block.

In an aspect, the cross-attention block includes 16 cross-attention modules, 16 token embeddings are trained for the 16 cross-attention modules, and each token embedding is injected into one cross-attention module.

In an aspect, the LDM-based I2V generation model is trained using a training sample obtained from a reference video.

In an aspect, a localization loss is applied on a cross-attention map during training of the LDM-based I2V generation model to maximize similarity inside a subject location.

In an aspect, the story designer AI agent 108 is configured to update the multi-shot video by iteratively performing the steps of sending the multi-shot video generated during a previous iteration to the observer AI agent 116 via the agent manager AI agent 114, receiving the review result from the observer AI agent 116 via the agent manager AI agent 114, and refining the multi-shot video based on the review result until a predefined criterion is met.

In an aspect, the agent manager AI agent 114 is configured to manage data flow between the story designer AI agent 108, the storyboard generator AI agent 110, the video creator AI agent 112, and the observer AI agent 116.

In an aspect, the agent manager AI agent 114 and the agent manager AI agent 114 are configured such that the reviewer AI agent applies a multimodal large language model to assess data generated by the story designer AI agent 108, the storyboard generator AI agent 110, and the video creator AI agent 112, and informs the agent manager AI agent 114 of a result of the assessment.

In an aspect, the textual prompt provided by the user includes a background description of the multi-shot video, an action of the customized subject, and a number of shots included in the multi-shot video.

Next, further details of the hardware description of the computing environment of FIG. 1 according to exemplary embodiments is described with reference to FIG. 13.

The hardware elements in order to achieve the computing device may be realized by various circuitry elements, known to those skilled in the art. For example, CPU 1301 or CPU 1303 may be a Xenon or Core processor from Intel of America or an Opteron processor from AMD of America, or may be other processor types that would be recognized by one of ordinary skill in the art. Alternatively, the CPU 1301, 1303 may be implemented on an FPGA, ASIC, PLD or using discrete logic circuits, as one of ordinary skilled in the art would recognize. Further, CPU 1301, 1303 may be implemented as multiple processors cooperatively working in parallel to perform the instructions of the inventive processes described above.

Figure 13:
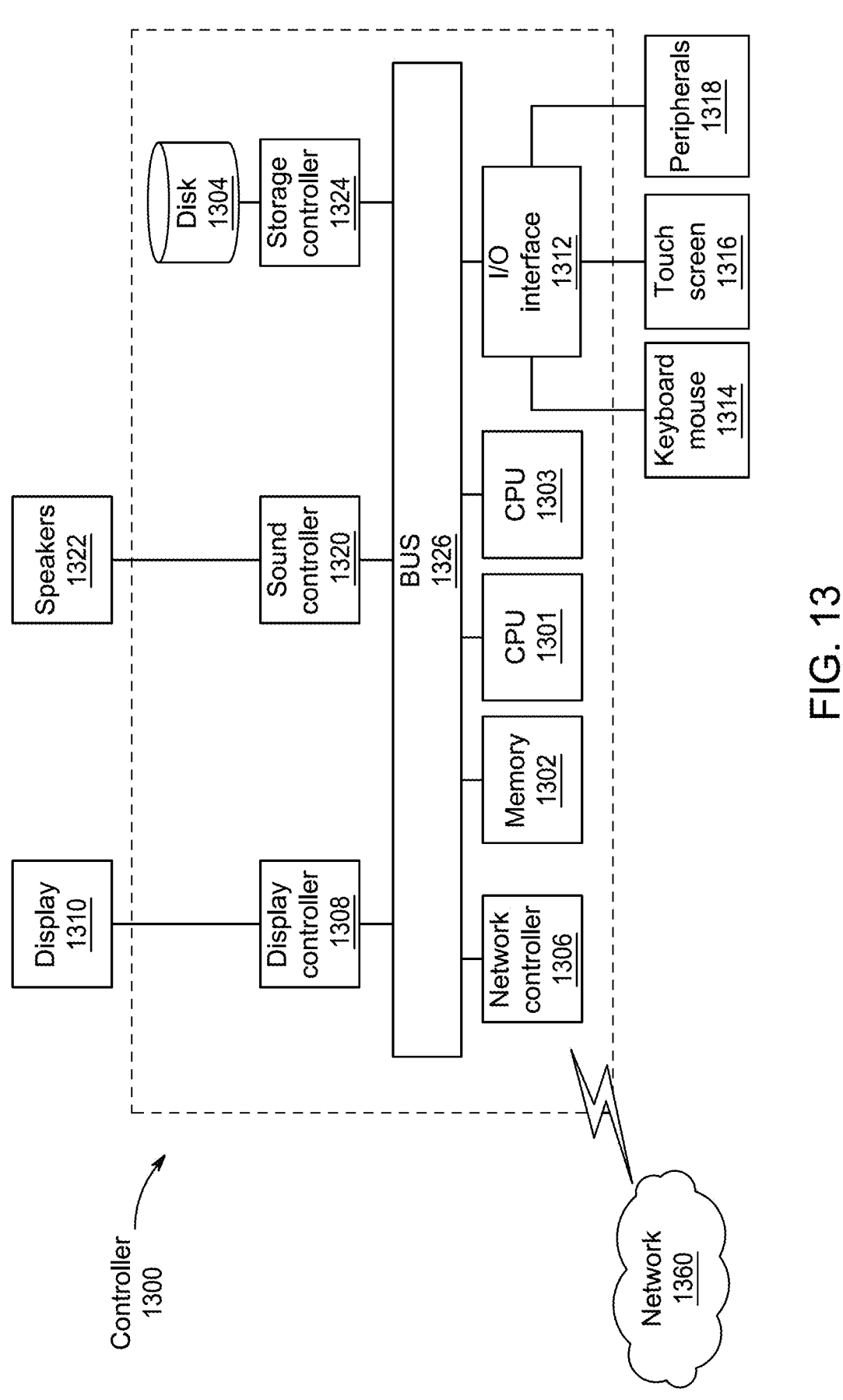
FIG. 13 is an illustration of a non-limiting example of details of computing hardware used in a computing system, according to certain embodiments.

The computing device in FIG. 13 also includes a network controller 1306, such as an Intel Ethernet PRO network interface card from Intel Corporation of America, for interfacing with network 1360. As can be appreciated, the network 1360 can be a public network, such as the Internet, or a private network such as an LAN or WAN network, or any combination thereof and can also include PSTN or ISDN sub-networks. The network 1360 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 1308, such as a NVIDIA Geforce GTX or Quadro graphics adaptor from NVIDIA Corporation of America for interfacing with display 1310, such as a Hewlett Packard HPL2445w LCD monitor. A general purpose I/O interface 1312 interfaces with a keyboard and/or mouse 1214 as well as a touch screen panel 1316 on or separate from display 1310. General purpose I/O interface also connects to a variety of peripherals 1318 including printers and scanners, such as an OfficeJet or DeskJet from Hewlett Packard.

A sound controller 1320 is also provided in the computing device such as Sound Blaster X-Fi Titanium from Creative, to interface with speakers/microphone 1322 thereby providing sounds and/or music.

The general-purpose storage controller 1324 connects the storage medium disk 1304 with communication bus 1326, which may be an ISA, EISA, VESA, PCI, or similar, for interconnecting all of the components of the computing device. A description of the general features and functionality of the display 1310, keyboard and/or mouse 1314, as well as the display controller 1308, storage controller 1324, network controller 1306, sound controller 1320, and general purpose I/O interface 1312 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 13.

Figure 14:
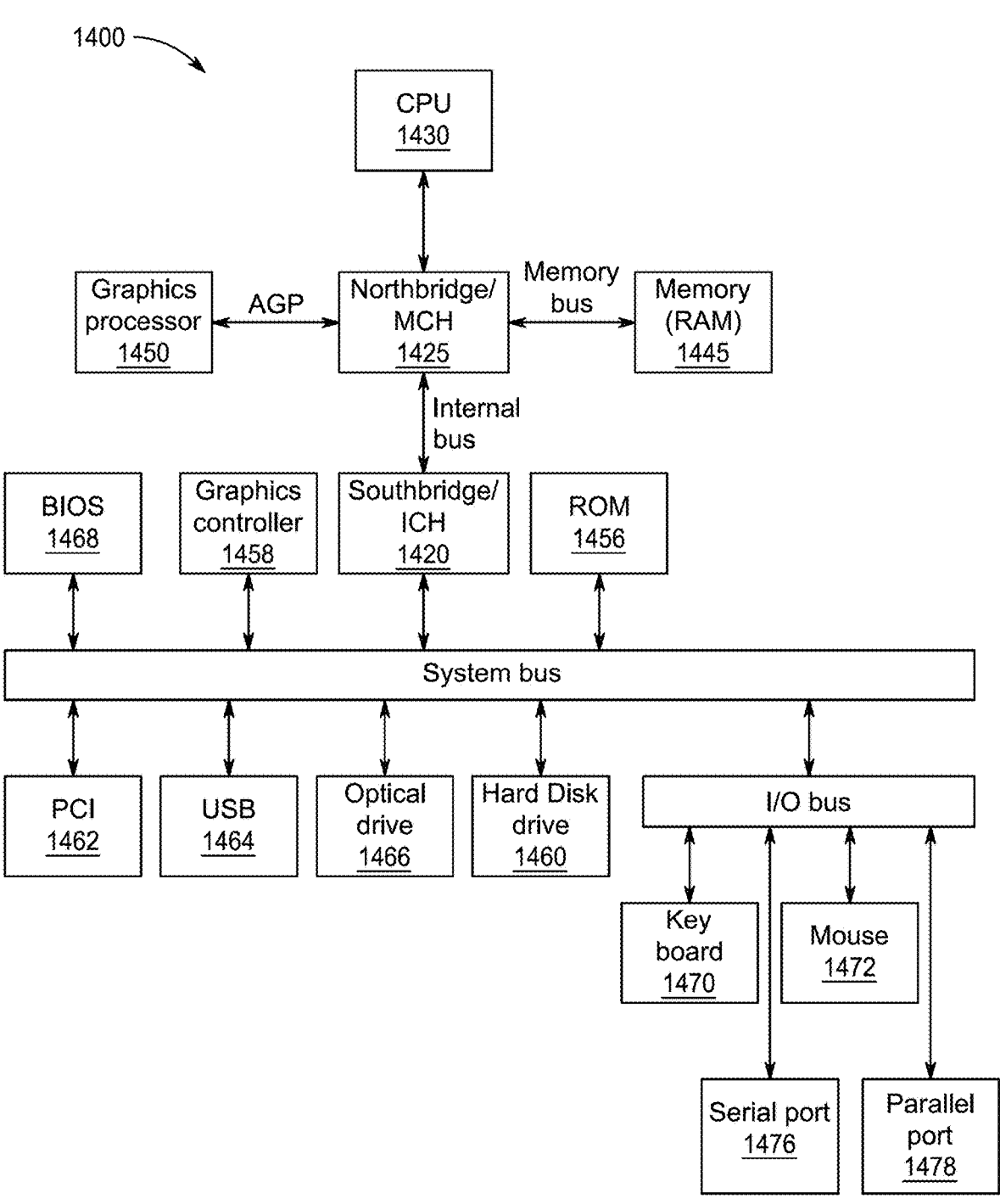
FIG. 14 is an exemplary schematic diagram of a data processing system used within the computing system, according to certain embodiments.

FIG. 14 shows a schematic diagram of a data processing system, according to certain embodiments, for performing the functions of the exemplary embodiments. The data processing system is an example of a computer in which code or instructions implementing the processes of the illustrative embodiments may be located.

In FIG. 14, data processing system 1400 employs a hub architecture including a north bridge and memory controller hub (NB/MCH) 1425 and a south bridge and input/output (I/O) controller hub (SB/ICH) 1420. The central processing unit (CPU) 1430 is connected to NB/MCH 1425. The NB/MCH 1425 also connects to the memory 1445 via a memory bus and connects to the graphics processor 1450 via an accelerated graphics port (AGP). The NB/MCH 1425 also connects to the SB/ICH 1420 via an internal bus (e.g., a unified media interface or a direct media interface). The CPU Processing unit 1430 may contain one or more processors and even may be implemented using one or more heterogeneous processor systems.

Figure 15:
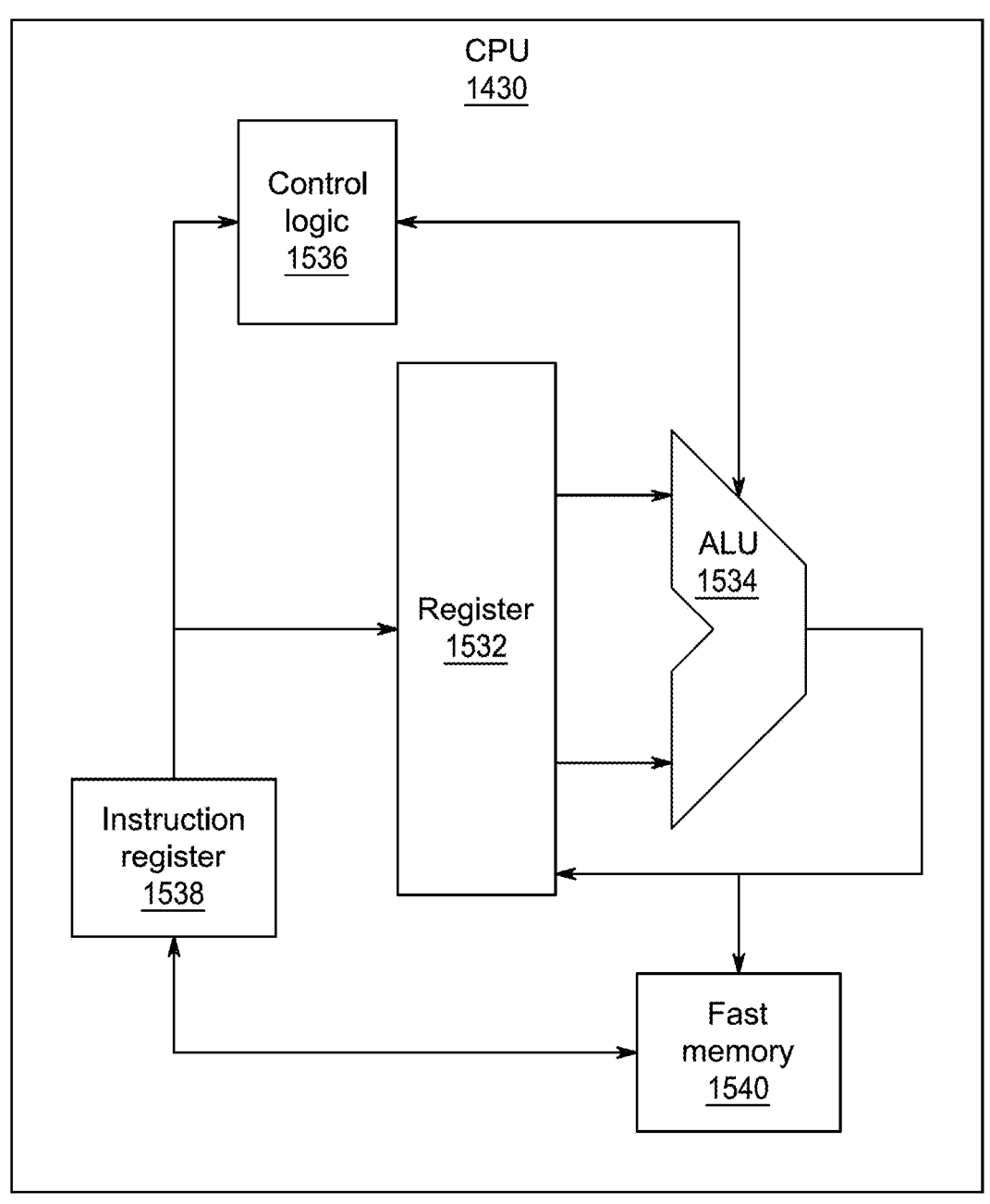
FIG. 15 is an exemplary schematic diagram of a processor used with the computing system, according to certain embodiments.

For example, FIG. 15 shows one implementation of CPU 1430. In one implementation, the instruction register 1532 retrieves instructions from the fast memory 1540. At least part of these instructions is fetched from the instruction register 1532 by the control logic 1536 and interpreted according to the instruction set architecture of the CPU 1430. Part of the instructions can also be directed to the register 1532. In one implementation, the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1534 that loads values from the register 1532 and performs logical and mathematical operations on the loaded values according to the instructions. The results from these operations can be feedback into the register and/or stored in the fast memory 1540. According to certain implementations, the instruction set architecture of the CPU 1330 can use a reduced instruction set architecture, a complex instruction set architecture, a vector processor architecture, a very large instruction word architecture. Furthermore, the CPU 1430 can be based on the Von Neuman model or the Harvard model. The CPU 1430 can be a digital signal processor, an FPGA, an ASIC, a PLA, a PLD, or a CPLD. Further, the CPU 1430 can be an x56 processor by Intel or by AMD; an ARM processor, a Power architecture processor by, e.g., IBM; a SPARC architecture processor by Sun Microsystems or by Oracle; or other known CPU architecture.

Referring again to FIG. 14, the data processing system 1400 can include that the SB/ICH 1420 is coupled through a system bus to an I/O Bus, a read only memory (ROM) 1456, universal serial bus (USB) port 1464, a flash binary input/output system (BIOS) 1468, and a graphics controller 1458. PCI/PCIe devices can also be coupled to SB/ICH 1420 through a PCI bus 1462.

The PCI devices may include, for example, Ethernet adapters, add-in cards, and PC cards for notebook computers. The Hard disk drive 1460 and CD-ROM666 can use, for example, an integrated drive electronics (IDE) or serial advanced technology attachment (SATA) interface. In one implementation the I/O bus can include a super I/O (SIO) device.

Further, the hard disk drive (HDD) 1460 and optical drive 1466 can also be coupled to the SB/ICH 1420 through a system bus. In one implementation, a keyboard 1470, a mouse 1472, a parallel port 1478, and a serial port 1476 can be connected to the system bus through the I/O bus. Other peripherals and devices that can be connected to the SB/ICH 1420 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 16:
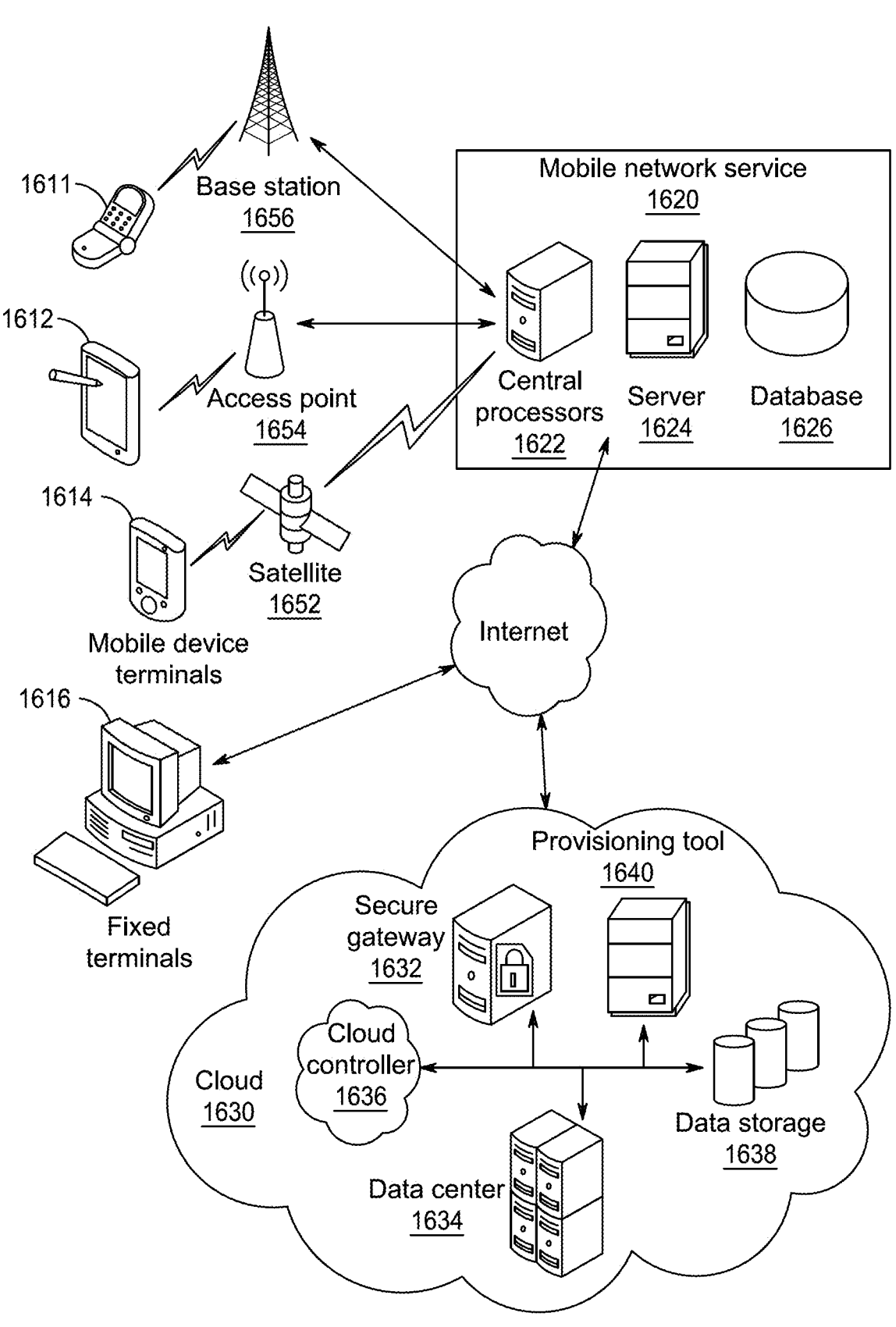
FIG. 16 is an illustration of a non-limiting example of distributed components which may share processing with a controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 16, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely, either in real-time or as a batch process. Additionally, some aspects of the present disclosures may be performed on modules or hardware not identical to those described. Accordingly, other aspects of the present disclosures are within the scope that may be claimed. More specifically, FIG. 16 illustrates client devices including smart phone 1611, tablet 1612, mobile device terminal 1614 and fixed terminals 1616. These client devices may be commutatively coupled with a mobile network service 1620 via base station 1656, access point 1654, satellite 1652 or via an internet connection. Mobile network service 1620 may comprise central processors 1622, server 1624 and database 1626. Fixed terminals 1616 and mobile network service 1620 may be commutatively coupled via an internet connection to functions in cloud 1630 that may comprise security gateway 1632, data center 1634, cloud controller 1636, data storage 1638 and provisioning tool 1640.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A system for performing artificial intelligence (AI)-based customized storytelling video generation, comprising:
    a story designer AI agent;
    a storyboard generator AI agent;
    a video creator AI agent;
    an agent manager AI agent; and
    an observer AI agent, wherein
    based on a textual prompt and a reference video provided by a user of the system, under coordination of the agent manager AI agent, the story designer AI agent, the storyboard generator AI agent, the video creator AI agent, and the observer AI agent cooperate to generate a multi-shot video, the multi-shot video depicting a story of a customized subject presented in the reference video,
    each of the story designer AI agent, the agent manager AI agent, and the observer AI agent is based on a Large Language Model (LLM),
    the storyboard generator AI agent uses a three-step storyboard generation pipeline to preserve consistency of character details of the customized subject across shots of the multi-shot video, the pipeline including a generation step, a removal step, and a redrawing step, and the video creator AI agent is based on a Latent Diffusion Model (LDM)-based Image-to-Video (I2V) generation model configured to preserve the consistency of the character details of the customized subject within each shot of the multi-shot video.

2. The system of claim 1, wherein the story designer AI agent is configured to apply an LLM to generate a story script based on the textual prompt, the generated story script includes a plurality of story descriptions, and each story description corresponds to one shot of the multi-shot video.

3. The system of claim 2, wherein the story designer AI agent is further configured to generate the story script by:

identifying a story requirement from the textual prompt, generating a narrative storyline based on the story requirement, decomposing the narrative storyline into multiple shots, generating the plurality of story descriptions, each story description corresponding to one shot of the multiple shots, and updating the narrative storyline and the plurality of story descriptions, based on a review result made by the observer AI agent.

4. The system of claim 2, wherein each story description of the plurality of story descriptions describes, for a corresponding shot of the multi-shot video:

a character shown in the shot, an action of the character, a character region in the shot, a background scene, a shot type, and a shot motion.

5. The system of claim 3, wherein the story designer AI agent is further configured to update the narrative storyline and the plurality of story descriptions by iteratively performing:

via the agent manager AI agent, sending the narrative storyline and the plurality of story descriptions generated during a previous iteration to the observer AI agent, via the agent manager AI agent, receiving the review result from the observer AI agent, and refining the narrative storyline and the plurality of story descriptions, based on the review result, until a predefined criterion is met.

6. The system of claim 5, wherein the predefined criterion is:

the review result from the observer AI agent indicating that the narrative storyline and the plurality of story descriptions are approved, or a maximum iteration number being reached.

7. The system of claim 2, wherein the storyboard generator AI agent is configured to generate a plurality of storyboard images, based on the plurality of story descriptions and the reference video, and each storyboard image presents contents of one shot of the multi-shot video.

8. The system of claim 7, wherein the storyboard generator AI agent is further configured to generate the plurality of storyboard images by:

obtaining, based on the reference video, a subject image with background removed, the subject image depicting the customized subject of the multi-shot video, generating a plurality of initial storyboard images based on the plurality of story descriptions, applying a removal algorithm to perform subject segmentation on the plurality of initial storyboard images, so as to generate a plurality of subject masks within the plurality of initial storyboard images, redrawing, based on the subject image, mask positions corresponding to the plurality of subject masks, so as to generate the plurality of storyboard images, and updating the plurality of storyboard images, based on a review result made by the observer AI agent.

9. The system of claim 8, wherein the storyboard generator AI agent is further configured to update the plurality of storyboard images by iteratively performing:

via the agent manager AI agent, sending the plurality of storyboard images generated during a previous iteration to the observer AI agent, via the agent manager AI agent, receiving the review result from the observer AI agent, and refining the plurality of storyboard images based on the review result, until a predefined criterion is met.

10. The system of claim 7, wherein the video creator AI agent is configured to apply the LDM-based I2V generation model to:

generate the multi-shot video based on the plurality of story descriptions, the plurality of storyboard images, and the reference video, and update the multi-shot video based on a review result made by the observer AI agent.

11. The system of claim 10, wherein the LDM-based I2V generation model includes a variational autoencoder (VAE) encoder and decoder, a text encoder, an image condition encoder, and a 3D U-Net, and the LDM-based I2V generation model is further configured to generate the multi-shot video by:

sampling a noisy video from a Gaussian distribution, encoding the plurality of storyboard images via the VAE encoder to obtain latent representations of the plurality of storyboard images, concatenating the latent representations with the noisy video as an input into the 3D U-Net, extracting a text embedding via the text encoder from the plurality of story descriptions, extracting an image embedding via the image condition encoder from the plurality of storyboard images, injecting the text embedding and the image embedding into the 3D U-Net, feeding an output of the 3D U-Net into the VAE decoder, and obtaining the multi-shot video at an output of the VAE decoder.

12. The system of claim 11, wherein the 3D U-Net includes a self-attention block, a temporal attention block, and a cross-attention block, and the text embedding and the image embedding are injected into the cross-attention block.

13. The system of claim 12, wherein a parameter is trained for each linear projection in the self-attention block, the temporal attention block, and the cross-attention block.

14. The system of claim 12, wherein the cross-attention block includes 16 cross-attention modules, 16 token embeddings are trained for the 16 cross-attention modules, and each token embedding is injected into one cross-attention module.

15. The system of claim 10, wherein the LDM-based I2V generation model is trained using a training sample obtained from the reference video.

16. The system of claim 15, wherein a localization loss is applied on a cross-attention map during the training of the LDM-based I2V generation model, to maximize a similarity inside a subject location.

17. The system of claim 10, wherein the story designer AI agent is further configured to update the multi-shot video by iteratively performing:

via the agent manager AI agent, sending the multi-shot video generated during a previous iteration to the observer AI agent, via the agent manager AI agent, receiving the review result from the observer AI agent, and refining the multi-shot video based on the review result, until a predefined criterion is met.

18. The system of claim 1, wherein the agent manager AI agent is configured to manage data flow between the story designer AI agent, the storyboard generator AI agent, the video creator AI agent, and the observer AI agent.

19. The system of claim 1, wherein the reviewer AI agent is further configured to apply a multimodal LLM to assess data generated by the story designer AI agent, the storyboard generator AI agent, and the video creator AI agent, and inform the agent manager AI agent of a result of the assessment.

20. The system of claim 1, wherein the textual prompt provided by the user of the system includes:

a background description of the multi-shot video, an action of the customized subject, and a number of shots included in the multi-shot video.

* * * * *